United States Patent
Kim et al.

(10) Patent No.: US 11,548,262 B2
(45) Date of Patent: Jan. 10, 2023

(54) BONDING FILM, AND LIGHT-TRANSMITTING LAMINATE INCLUDING SAME

(71) Applicant: SKC Co., Ltd., Suwon-si (KR)

(72) Inventors: Hyejin Kim, Suwon-si (KR); Kyuhun Kim, Seoul (KR); Sungjin Chung, Seoul (KR); Jaechul Han, Ulsan (KR)

(73) Assignee: SKC Co., Ltd., Suwon-si (KR)

(*) Notice: Subject to any disclaimer, the term of this patent is extended or adjusted under 35 U.S.C. 154(b) by 0 days.

(21) Appl. No.: 17/666,772

(22) Filed: Feb. 8, 2022

(65) Prior Publication Data

US 2022/0161515 A1    May 26, 2022

Related U.S. Application Data

(63) Continuation of application No. PCT/KR2020/010453, filed on Aug. 7, 2020.

(30) Foreign Application Priority Data

Aug. 9, 2019  (KR) .......................... 10-2019-0097413
Aug. 23, 2019  (KR) .......................... 10-2019-0103615

(Continued)

(51) Int. Cl.
*B32B 3/30*     (2006.01)
*B32B 3/26*     (2006.01)
(Continued)

(52) U.S. Cl.
CPC .............. *B32B 3/30* (2013.01); *B32B 3/263* (2013.01); *B32B 17/10302* (2013.01);
(Continued)

(58) Field of Classification Search
CPC ..... B32B 3/30; B32B 3/263; B32B 17/10302; B32B 17/10761; B32B 17/10889;
(Continued)

(56) References Cited

U.S. PATENT DOCUMENTS

| 2018/0022058 A1 | 1/2018 | Nakayama et al. |
| 2018/0272661 A1 | 9/2018 | Nishino et al. |
| 2018/0347067 A1* | 12/2018 | Kernig ............... C22C 21/08 |

FOREIGN PATENT DOCUMENTS

| CN | 105102223 A | 11/2015 |
| CN | 108633289 A | 10/2018 |
| JP | 10-17338 A | 1/1998 |
| JP | 2000-256044 A | 9/2000 |
| JP | 2001-114538 A | 4/2001 |
| JP | 2001-220183 A | 8/2001 |

(Continued)

OTHER PUBLICATIONS

International Search Report dated Dec. 23, 2020, in counterpart International Application No. PCT/KR2020/010453 (3 pages in English and 2 pages in Korean).

*Primary Examiner* — Megha M Gaitonde
(74) *Attorney, Agent, or Firm* — NSIP Law

(57) ABSTRACT

Embodiment relates to film for bonding, and a light-transmitting laminate including the same and the like, a film for bonding comprising an embossed surface, wherein the embossed surface has an A2/A1 value of 1 or less are disclosed. A film for bonding have improved in deairing stability during formation of a light transmitting laminate, an edge sealing characteristic, and the like by controlling characteristics of a embossed surface.

13 Claims, 3 Drawing Sheets

(30) Foreign Application Priority Data

Aug. 27, 2019 (KR) .................. 10-2019-0105222
Nov. 13, 2019 (KR) .................. 10-2019-0145153
Jan. 22, 2020 (KR) .................. 10-2020-0008459

(51) Int. Cl.
| | | |
|---|---|---|
| *B32B 17/10* | (2006.01) | |
| *C08J 5/18* | (2006.01) | |
| *B60J 1/00* | (2006.01) | |

(52) U.S. Cl.
CPC .................. *B32B 17/10761* (2013.01); *B32B 17/10889* (2013.01); *B32B 17/10935* (2013.01); *C08J 5/18* (2013.01); *B60J 1/001* (2013.01); *C08J 2329/14* (2013.01)

(58) Field of Classification Search
CPC ........ B32B 17/10935; B32B 17/10577; B32B 17/10587; C08J 5/18; C08J 2329/14; B60J 1/001; Y10T 428/24355; Y10T 428/24479; Y10T 428/24942; Y10T 428/2495; Y10T 428/24959
USPC .................. 428/141, 156, 213, 214
See application file for complete search history.

(56) References Cited

FOREIGN PATENT DOCUMENTS

| | | |
|---|---|---|
| JP | 2002-104846 A | 4/2002 |
| JP | 2003-48762 A | 2/2003 |
| JP | 2014-501641 A | 1/2014 |
| JP | 2017-178678 A | 10/2017 |
| KR | 10-1376061 B | 3/2014 |
| KR | 10-2014-0141720 A | 12/2014 |
| KR | 10-2016-0039147 A | 4/2016 |
| KR | 10-2016-0039566 A | 4/2016 |
| KR | 10-2017-0022971 A | 3/2017 |
| KR | 10-1719750 B | 3/2017 |
| KR | 10-2017-0135830 A | 12/2017 |
| KR | 10-2018-0061189 A | 6/2018 |
| KR | 10-1886913 B | 8/2018 |
| KR | 10-2018-0104725 A | 9/2018 |
| KR | 10-1986330 B | 6/2019 |
| KR | 10-1986765 B | 6/2019 |
| KR | 10-2005189 B | 7/2019 |
| KR | 10-2005190 B | 7/2019 |
| KR | 10-2005670 B | 7/2019 |
| KR | 10-2005673 B | 7/2019 |
| KR | 10-2019-0125894 A | 11/2019 |
| KR | 10-2041046 B | 11/2019 |
| KR | 10-2019-0137316 A | 12/2019 |
| WO | WO 2017/039004 A1 | 3/2017 |

* cited by examiner

BONDING FILM, AND LIGHT-TRANSMITTING LAMINATE INCLUDING SAME

CROSS-REFERENCE TO RELATED APPLICATIONS

Pursuant to 35 USC 120 and 365(c), this application is a continuation of International Application No. PCT/KR2020/010453 filed on Aug. 7, 2020, and claims the benefits of Korean Patent Application No. 10-2019-0097413 filed on Aug. 9, 2019, Korean Patent Application No. 10-2019-0103615 filed on Aug. 23, 2019, Korean Patent Application No. 10-2020-0008459 filed on Jan. 22, 2020, Korean Patent Application No. 10-2019-0105222 filed on Aug. 27, 2019, and Korean Patent Application No. 10-2019-0145153 filed on Nov. 13, 2019 in the Korean Intellectual Property Office, and the entire disclosures of which are incorporated herein by reference for all purposes.

TECHNICAL FIELD

An embodiment relates to a bonding film, and a light-transmitting laminate including the same.

BACKGROUND ART

Polyvinyl acetal is being used as an interlayer (film for laminated glass) of a laminated glass (safety glass) or a light transmitting laminate. Laminated glass is mainly used in windows of architecture, cladding, and window glass of automobiles, and due to characteristics, such as anti-scattering of glass fragments when broken and penetration resistance against impact of a certain strength, it can secure stability for minimizing damage or injury given to objects or people placed in the inside thereof.

A film for bonding may be a wedge-shaped film whose section has an even wedge angle for preventing the formation of a double-image when used as a Head Up Display film.

A film for bonding has plural minute embossments formed in the surface to improve a characteristic of preventing blocking among interlayers, a workability of overlapping a glass plate with an interlayer (sliding degree from a glass plate as handling workability), and de-airing stability when processed to be laminated with a glass plate.

When a film for bonding in which embossments are formed is used in lamination, there is a possibility of generating an interference pattern or a bubble due to the embossments placed in both surfaces of the film, and a case of lowering visibility may be made. Also, there is a problem of degrading workability when a dazzle occurs.

Related Prior Art

Korean Registered Patent Application No. 10-1376061, and
Japanese Patent Publication No. 2001-220183.

DETAILED DESCRIPTION OF THE INVENTION

Technical Problem

The purpose of the embodiment is to provide a film for bonding, and a light-transmitting laminate including the same which has improved De-Airing properties, Edge sealing properties, and the like, and can suppress to occurring a ghost image in a Head-Up Display.

Technical Solution

In one general aspect, a film for bonding according to one embodiment includes an embossed surface, and the embossed surface has an A2/A1 value of 1 or less.

A Sz value of the embossed surface may be 30 um or more and 90 um or less.

A Sz value of the embossed surface may be 40 um or more and 80 um or less.

The A1 value may be 0.5 or more.

The A2 value may be 0.6 or less.

The film for bonding may be a single layer film or a laminated film with two or more layers.

The film for bonding may include a polyvinyl acetal resin.

The film for bonding may include a wedge shape in a part or all at the cross-section.

In one embodiment, a light-transmitting laminate according to another embodiment includes a first light transmitting layer; a film for bonding disposed on one surface of the first light transmitting layer; and a second light transmitting layer disposed on the film for bonding, wherein the film for bonding has an embossed surface, and wherein the embossed surface has an A2/A1 value of 1 or less.

The total number of bubbles counted by 3 light-transmitting laminates with a length of 300 mm and a width of 300 mm may be 5 or less.

One selected from the group consisting of the first transmission layer, the second transmission layer, and a combination thereof may be aged glass.

In one embodiment, a vehicle according to another embodiment includes the light-transmitting laminate.

In one general aspect, a film for bonding according to one embodiment includes an embossed surface having a regular pattern or an irregular pattern.

The embossed surface has a Mr1 value and a Mr2 value.

A rev_Mr2 value is a value of subtracting the Mr2 value from 100%.

The embossed surface has a Mr1 value which is equal to or greater than the rev_Mr2 value.

A peak valley distribution value (Spv) is calculated by below Equation 1, and the peak valley distribution value of the embossed surface may be 0% or more and 25% or less.

$$Spv = Mr1 - rev\_Mr2 \quad \text{[Equation 1]}$$

wherein in the Equation 1, the Spv is peak valley distribution value, and the rev_Mr2 value is a value of subtracting the Mr2 value from 100%.

The Mr1 value may be 10% or more.

A Sz value of the embossed surface may be 30 um or more and 90 um or less.

The film for bonding may be a single layer film or a laminated film with two or more layers.

The film for bonding may include a polyvinyl acetal resin.

The film for bonding may include a wedge shape in a part or all at the cross-section.

In one embodiment, a light-transmitting laminate according to another embodiment includes a first light transmitting layer; a film for bonding disposed on one surface of the first light transmitting layer; and a second light transmitting layer disposed on the film for bonding.

The film for bonding includes an embossed surface having a regular pattern or an irregular pattern.

The embossed surface has a Mr1 value and a Mr2 value.

A rev_Mr2 value is a value of subtracting the Mr2 value from 100%.

The embossed surface has a Mr1 value which is equal to or greater than the rev_Mr2 value.

The total number of bubbles counted by 3 light-transmitting laminates with a length of 300 mm and a width of 300 mm may be 5 or less.

One selected from the group consisting of the first transmission layer, the second transmission layer, and a combination thereof may be aged glass.

In one embodiment, a vehicle according to another embodiment includes the light-transmitting laminate.

In one general aspect, a film for bonding according to another embodiment includes an embossed surface having a regular pattern or an irregular pattern, and the embossed surface has a DSvk value of 6 um or less which is calculated by below Equation 2.

$$DSvk = S^*vk - Svk \quad \text{[Equation 2]}$$

wherein in the Equation 2, the Svk value is a value calculated by ISO_25178, and the S*vk value is a height value of a point where an areal material ratio is a Mr2 in an areal material ratio curve according to ISO_25178.

The film for bonding includes a plasticizer in an amount of 24 to 40 wt % based on the total film for bonding.

A ratio of the Svk value to the DSvk value of the film for bonding may be 0.1 or more and 1.5 or less.

An A2 value of the embossed surface may be 0.16 or more and 0.5 or less.

The Svk of the embossed surface may be 4 or more and 10 um or less.

The S*vk of the embossed surface may be 12 um or less.

The DSvk/Sz value of the embossed surface may be 0.01 to 0.08.

A Sz value of the embossed surface may be 30 to 90 um.

The film for bonding may be a single layer film or a laminated film with two or more layers.

The film for bonding may include a polyvinyl acetal resin.

The film for bonding may include a sound insulating layer.

In one embodiment, a light-transmitting laminate according to another embodiment includes a first light transmitting layer; a film for bonding disposed on one surface of the first light transmitting layer; and a second light transmitting layer disposed on the film for bonding.

The film for bonding includes an embossed surface having a regular pattern or an irregular pattern.

The embossed surface has a DSvk value of 6 um or less which is calculated by below Equation 2.

$$DSvk = S^*vk - Svk \quad \text{[Equation 2]}$$

wherein in the Equation 2, the Svk value is a value calculated by ISO_25178, and the S*vk value is a height value of a point where an areal material ratio is a Mr2 in an areal material ratio curve according to ISO_25178.

The film for bonding includes a plasticizer in an amount of 24 to 40 wt % based on the total film for bonding.

The total number of bubbles counted after placing 3 light-transmitting laminates with a length of 300 mm and a width of 300 mm for 120 hours at the condition of 85° C. and 95% RH may be 5 or less.

In one embodiment, a vehicle according to another embodiment includes the light-transmitting laminate as a windshield.

In one general aspect, a film for bonding according to one embodiment includes an embossed surface, and A2/A1 value of the embossed surface is 1 or less.

The film for bonding includes a thickness increasing area.

The thickness increasing area has both ends which are one end and the other end, and a thickness of the one end is different from a thickness of the other end.

A wedge angle (θ) of the film for bonding is calculated by below Equation 3, and the wedge angle of the thickness increasing area may be 0.01 to 0.04°.

$$\theta = \arctan\left(\frac{Hb - Ha}{w}\right) \quad \text{[Equation 1]}$$

wherein in the Equation 3, the Hb is a thickness of thicker one between the one end and the other end of the thickness increasing area, the Ha is a thickness of thinner one between the one end and the other end of the thickness increasing area, and the w is a width from the one end to the other end of the thickness increasing area.

A ratio of the Ha to the w may be 0.0002 or more and 0.0015 or less.

The thickness increasing area of the film for bonding may be deposited at a part or all of the film for bonding.

A Sz value of the embossed surface may be 30 um or more and 90 um or less.

A Sz value of the embossed surface may be 40 um or more and 80 um or less.

The A1 value may be 0.5 or more.

The A2 value may be 0.6 or less.

The film for bonding may be a single layer film or a laminated film with two or more layers.

The film for bonding may include a polyvinyl acetal resin.

The film for bonding may include a sound insulating layer.

In one embodiment, a light-transmitting laminate according to another embodiment includes a first light transmitting layer; a film for bonding disposed on one surface of the first light transmitting layer; and a second light transmitting layer disposed on the film for bonding.

The film for bonding includes an embossed surface.

A2/A1 value of the embossed surface is 1 or less.

The film for bonding includes a thickness increasing area.

The thickness increasing area has both ends which are one end and the other end, and a thickness of the one end is different from a thickness of the other end.

The total number of bubbles counted by 3 light-transmitting laminates with a length of 900 mm and a width of 300 mm may be 5 or less.

One selected from the group consisting of the first transmission layer, the second transmission layer, and a combination thereof may be aged glass.

In one embodiment, a vehicle according to another embodiment includes the light-transmitting laminate.

In one general aspect, a film for bonding according to one embodiment includes an embossed surface having a regular pattern or an irregular pattern.

The embossed surface has a Mr1 value and a Mr2 value.

A rev_Mr2 value is a value of subtracting the Mr2 value from 100%.

The embossed surface has a Mr1 value which is equal to or greater than the rev_Mr2 value.

The film for bonding includes a thickness increasing area.

The thickness increasing area has both ends which are one end and the other end, and a thickness of the one end is different from a thickness of the other end.

A wedge angle (θ) is calculated by below Equation 3.

$$\theta = \arctan\left(\frac{Hb - Ha}{w}\right) \quad \text{[Equation 3]}$$

wherein in the Equation 3, the Hb is a thickness of thicker one between the one end and the other end of the thickness increasing area, the Ha is a thickness of thinner one between the one end and the other end of the thickness increasing area, and the w is a width from the one end to the other end of the thickness increasing area.

The wedge angle of the thickness increasing area may be 0.01 to 0.04°.

A ratio of the Ha to the w may be 0.0002 or more and 0.0015 or less.

The thickness increasing area of the film for bonding may be disposed at a part or all of the film for bonding.

A peak valley distribution value Spv is calculated by below Equation 1, and the peak valley distribution value of the embossed surface may be 0% or more and 25% or less.

$$Spv = Mr1 - rev\_Mr2 \quad \text{[Equation 1]}$$

wherein in the Equation 1, the Spv is peak valley distribution value, and the rev_Mr2 value is a value of subtracting the Mr2 value from 100%.

The Mr1 value may be 10% or more.

A Sz value of the embossed surface of the film for bonding may be 30 um or more and 90 um or less.

The film for bonding may be a single layer film or a laminated film with two or more layers.

The film for bonding may include a polyvinyl acetal resin.

The film for bonding may include a sound insulating layer.

In one embodiment, a light-transmitting laminate according to another embodiment includes a first light transmitting layer; a film for bonding disposed on one surface of the first light transmitting layer; and a second light transmitting layer disposed on the film for bonding.

The film for bonding includes an embossed surface having a regular pattern or an irregular pattern.

The embossed surface has a Mr1 value and a Mr2 value.

A rev_Mr2 value is a value of subtracting the Mr2 value from 100%.

The embossed surface has a Mr1 value which is equal to or greater than the rev_Mr2 value.

The film for bonding includes a thickness increasing area.

The thickness increasing area has both ends which are one end and the other end, and a thickness of the one end is different from a thickness of the other end.

The total number of bubbles counted by 3 light-transmitting laminates with a length of 300 mm and a width of 300 mm may be 5 or less.

One selected from the group consisting of the first transmission layer, the second transmission layer, and a combination thereof may be aged glass.

In one embodiment, a vehicle according to another embodiment includes the light-transmitting laminate.

Advantageous Effects

A film for bonding and a light transmitting laminate including the same of example embodiment can provide a film for bonding improved in deairing stability during formation of a light transmitting laminate, an edge sealing characteristic, and the like by controlling characteristics of a surface where embossments are formed.

DETAILED DESCRIPTION OF EXEMPLARY EMBODIMENTS

Figure 1:
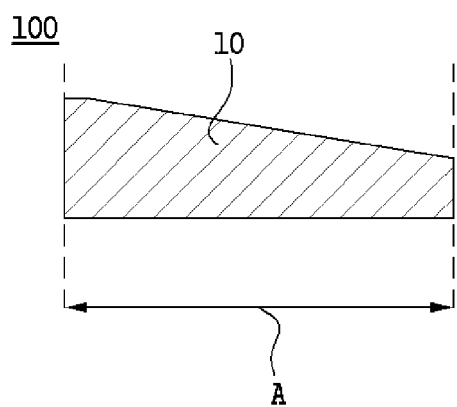
FIGS. 1 and 2 are respectively cross-sectional views schematically showing a film for bonding according to an embodiment.

Hereinafter, example embodiments of the present disclosure will be described in detail with reference to the accompanying drawings so that they can be easily practiced by those skilled in the art to which the present invention pertains. However, the example embodiments may be embodied in many different forms and is not to be construed as being limited to the embodiments set forth herein. Like reference numerals designate like elements throughout the specification.

In this application, terms for degree like "about", "substantially" and so on are used for meaning values approximative from/to the value when a tolerance to be proper to referred meaning for manufacture and substance is presented. Additionally, these terms for degree are used to help understand example embodiments and to prevent the presented content in which exact or absolute number is referred from being unjustly used by unconscionable trespassers.

Throughout this application, the phrase "combination(s) thereof" included in a Markush-type expression denotes one or more mixtures or combinations selected from the group consisting of components stated in the Markush-type expression, that is, denotes those one or more components selected from the group consisting of the components are included.

Throughout this application, the description of "A and/or B" means "A or B, or A and B."

Throughout this application, terms such as "first," "second," "A," or "B" are used to distinguish the same terms from each other.

In this application, "B being placed on A" means that B is placed in direct contact with A or placed over A with another layer or structure interposed therebetween and thus should not be interpreted as being limited to B being placed in direct contact with A.

In this application, a singular form is interpreted as including a plural form unless contextually stated otherwise to be obvious.

In this application, a size of each component of a drawing can be exaggerated and different from an actual size to be applied.

In this application, the amount of a hydroxyl group was evaluated by measuring an amount of an ethylene group with a hydroxyl group in the polyvinyl acetal resin in accordance with JIS K6728.

In this application, A1, A2, Mr1, Mr2, Sk, Spk, Svk, and Sz are values evaluated according to ISO_25178.

A1, A2, Mr1, Mr2, Sk, Spk, Svk, and S*vk are values derived from an Areal Material Ratio Curve (Abbott-Firestone Curve) graph and can be measured by a 3D roughness measurement.

An Areal Material Ratio Curve is a curve representing surface contour height of an object into a mathematical cumulative probability density function and is one of a method for indicating the surface characteristics of an object.

An Areal Material Ratio Curve applies equivalent straight line. The equivalent straight line includes 40% of the measured points of the Curve. A 40% section from the entire Areal material ratio (X-axis) is arbitrarily set in the curve and, when connecting both ends of the section, a line with a minimized slope is the equivalent straight line. Through the equivalent straight line, values representing surface characteristics such as A1, A2, Mr1, Mr2, Sk, Spk, Svk and S*vk values and the like can be derived.

A film for bonding has a surface embossing characteristic in a manner such as including a regular protruding pattern or a melt fracture in the surface to prevent unnecessary blocking between a surface and a surface when winded, and to achieve a deairing performance when laminated with a light transmitting layer such as glass. However, when a film is manufactured in consideration of only the deairing property, optical properties of the film may be degraded, or an edge sealing characteristic may be deficient. And when a film is manufactured in consideration of only the edge sealing characteristic, optical properties of the film may be degraded due to a problem such as bubble occurrence.

A pre-lamination is generally performed at a lower temperature than a lamination, and in the case of a process using a nip roll rather than a pre-bonding process using a vacuum ring, the temperature at which the glass is received is relatively lower, and the pre-lamination is generally performed at about 70° C. or less based on the temperature of the glass surface.

In order to obtain stable bonding performance when a pre-lamination is performed at a low temperature, it is common to obtain a processability by simply lowering the surface roughness of the embossed pattern, but it also functions as one of the causes of lowering deairing performance.

Meanwhile, the film for bonding can be laminated to a light transmission body such as a glass plate to form a light-transmitting laminate. The Embodiment can provide a Head-Up Display to a user (driver) by projecting an image on the light-transmitting laminate. However, the image projected on the light-transmitting laminate can form a double image while transmitting or being reflected in a light transmission body such as glass or a film for bonding, and the image can be recognized as a ghost image, or a sharpness of an image is dropped to a user. To suppress such a phenomenon, a film for bonding having a wedge shape is applied to a Head-Up Display.

Inventors have confirmed that, by controlling the characteristics such as A1, A2, Mr1, Mr2, Sk, Spk, Svk and S*vk values and the like of the embossed surface, it can be achieved both tradeoff features of the deairing performance and the edge sealing characteristic. And they have also confirmed that, by controlling a wedge angle of the film for bonding of light-transmitting laminate, it can be achieved a suppression of occurring ghost image of head-up display image. And then they present the Embodiment.

Hereinafter, an embodiment will be described in detail.

A1, A2, Mr1, Mr2, Sz, Sk, Spk, and Svk are evaluated according to ISO_25178.

A1, A2, Mr1, Mr2, Sk, Spk, Svk and S*vk are values derived from an Areal Material Ratio Curve (Abbott-Firestone Curve) graph. The A1, A2, Mr1, Mr2, Sk, Spk, Svk and S*vk may be the values measured and calculated by a 3D roughness measurement.

The measurement of the 3D roughness may be evaluated by an average value of values measured in a total area of 1,000,000 $\mu m^2$ or more. In detail, when measured by using a three-dimensional optical profiler or a 3D laser measuring microscope, the 3D roughness may be measured five times or more in different positions to be respectively area of 340,000 $\mu m^2$ or more, and an average of values excepting for the maximum value and the minimum value may be applied as a measuring value of three-dimensional roughness. When using a 3D laser measuring microscope, a 3D roughness may be measured by attaching neighboring images to be joined using a STICHING function, and the measurement using such a STICHING function may also be evaluated by an average of values measured in a total area of 1,000,000 $\mu m^2$ or more.

For example, Contour GT model as a 3D Optical Microscopy available from BRUKER may be used and a 3D roughness may be obtained by being measured in VSI (Vertical scanning Interferometry) mode.

In one general aspect, a film for bonding according to one embodiment in the present disclosure comprises an embossed surface, and A2/A1 value of the embossed surface is 1 or less.

The film for bonding comprises an embossed surface and A2/A1 value of the embossed surface may be 1 or less, preferably 0.85 or less, 0.02 or more, or preferably 0.05 or more. When A2/A1 value of the embossed surface is 1 or less, edge sealing characteristic may be improved while maintaining substantially suitable or better deairing stability. In addition, when the A2/A1 value of the embossed surface is in the above-mentioned range, the upper and the lower volume densities of the embossed surface may be appropriately adjusted, thereby improving the edge sealing property even at a relatively low temperature without a change in surface roughness.

The A1 value of the embossed surface in the film for bonding may be 0.5 or more, preferably greater than or equal to 0.6, and may be less than or equal to 3, preferably less than or equal to 2. When the A1 value is greater than or equal to 0.5, peak portions of the embossed surface can be controlled to be maintained at a predetermined volume or higher, and edge sealing properties together with deaeration performance can be improved.

The A2 value of the embossed surface in the film for bonding can be 0.6 or less, preferably 0.5 or less, and can be at least 0.05, preferably at least 0.1. When the A2 value is less than or equal to 0.6, the amount of air to be deaired is adjusted to be less than or equal to an appropriate level through having smaller volume of valley portion in the surface pattern of the film for bonding, and the deaeration stability can be more excellent.

The film for bonding may have an Sz value of 30 to 90 um on the embossed surface.

The Sz value is a value evaluated according to ISO_25178. The Sz value is the sum of the maximum peak height value and the maximum valley depth value and means the height difference value between the peak and the valley.

The Sz value can be measured and calculated by using a three-dimensional roughness measuring device. For example, Contour GT model as a 3D Optical Microscopy available from BRUKER may be used and a 3D roughness may be obtained by being measured in VSI (Vertical scanning Interferometry) mode (same as below).

A Sz value of the embossed surface of the film for bonding may be 30 to 90 um, 40 to 80 um, or 45 to 75 μm. The film for bonding having the embossed surface may have relatively excellent deairing stability.

The Sz value of the embossed surface has the above-described value, and at the same time the A2/A1 value has the features described above, even when a pre-laminating is applied at a low temperature, deairing stability is excellent and the edge sealing property can be improved at the same time.

In one embodiment, the film for bonding according to another embodiment comprises an embossed surface having a regular pattern or an irregular pattern.

The embossed surface has a Mr1 value and a Mr2 value.

A rev_Mr2 value is a value of subtracting the Mr2 value from 100%.

The embossed surface has a Mr1 value which is equal to or greater than the rev_Mr2 value.

When the Mr1 value is greater than or equal to the rev_Mr2 value, the volume density of a protruding peak and the volume density of a protruding valley are adjusted to an appropriate level, so that the edge sealing property can be improved while maintaining substantially equal or higher deairing stability.

The film for bonding has a peak valley distribution value (Spv). Spv is calculated by below Equation 1.

$$Spv = Mr1 - rev\_Mr2 \quad \text{[Equation 1]}$$

wherein in the Equation 1, the Spv is peak valley distribution value, and the rev_Mr2 value is a value of subtracting the Mr2 value from 100%.

The peak valley distribution value of the embossed surface may be 0% or more and 25% or less, or 1% or more and 15% or less. When the peak value distribution value is 0% or more and 25% or less, the volume density of a protruding valley of the valley part is controlled to be relatively low so that the low-temperature edge sealing property can be improved.

The Mr1 value of the embossed surface in the film for bonding may be 10% or more, preferably 12% or more, and can be 40% or less, preferably 38% or less. When the Mr1 value is greater than or equal to 10%, the volume density of a protruding peak constituting the pattern peak portion of the embossed surface is controlled such that the volume density of a protruding peak constituting the pattern peak portion of the embossed surface is maintained above a predetermined density, thereby further improving edge sealing.

In one embodiment, the film for bonding according to another embodiment comprises an embossed surface having a regular pattern or an irregular pattern. The embossed surface has a DSvk value of 6 um or less which is calculated by below Equation 2. The film for bonding comprises a plasticizer in an amount of 24 to 40 wt % based on the total film for bonding $$DSvk = S^*vk - Svk \quad \text{[Equation 2]}$$

wherein in the Equation 2, the Svk value is a value calculated by ISO_25178, and the S*vk value is a height value of a point where an areal material ratio is a Mr2 in an areal material ratio curve according to ISO_25178.

The DSvk value of the embossed surface may be 6 um or less. The DSvk value may be 5 um or less. The DSvk value may be 4 um or less. The DSvk value may be 1 um or more. The DSvk value may be 1.5 um or more. In this case, the bonding property of the film for bonding can be improved by suppressing the generation of a valley having an excessively deep depth compared to the average depth of the protruding valley.

A ratio of the Svk value to the DSvk value of the film for bonding may be 0.1 or more and 1.5 or less. The ratio is calculated by dividing the DSvk value into the Svk value.

The ratio of the Svk value to the DSvk value may be 0.1 or more. The ratio of the Svk value to the DSvk value may be 0.2 or more. The ratio of the Svk value to the DSvk value may be 1.5 or less. The ratio of the Svk value to the DSvk value may be 1.2 or less. In this case, the valley depth of the embossed surface is adjusted to be distributed within a limited range, so that a pattern including the valley can be eroded properly when laminated at a low temperature.

An A2 value of the embossed surface may be 0.16 or more and 0.5 or less.

An A2 value of the embossed surface may be 0.5 or less. The A2 value may be 0.3 or less. The A2 value may be 0.16 or more. The A2 value may be 0.18 or more. In this case, the volume density of the valley comprised in the embossed surface can be adjusted to smoothly discharge air remaining between the light transmission body and the film for bonding when the film for bonding is laminated to the light transmission body, and the pattern can be eroded properly when the bonding film is laminated at a low temperature, thereby improving the edge sealing property of the bonding film.

The Svk of the embossed surface may be 4 to 10 um or less. The Svk may be 4 um or more. The Svk may be 5 um or more. The Svk may be 10 um or less. The Svk may be 8 um or less. In this case, the depth distribution of the valley functioning as a deairing during laminating can be adjusted to improve the deairing of the film for bonding, and a pattern may not be observed on the surface of the light-transmitting laminate even when the laminating process is performed at a low temperature.

The S*vk of the embossed surface may be 12 um or less. The S*vk may be 11 um or less. The S*vk may be 3 um or more. The S*vk may be 5 um or more. In this case, it is possible to improve the optical properties of the light transmitting laminate which has passed through the laminating process since the pattern is largely reduced when the film for bonding is pre-laminated to the light transmission body by suppressing the formation of valley in the excessive depth.

The DSvk/Sz value of the embossed surface may be 0.01 to 0.08.

The Sz value is a value evaluated according to ISO_25178, and a measured and calculated value may be taken by using a three-dimensional roughness measuring device. The detailed measuring method of 3D roughness is the same as the method described in the above.

The DSvk/Sz value of the embossed surface may be 0.01 or more. The DSvk/Sz value may be 0.03 or more. The DSvk/Sz value may be 0.08 or less. The DSvk/Sz value may be 0.06 or less. In this case, the depth distribution of the valley relative to the surface roughness (Sz value) is adjusted to provide a film for bonding with having stable edge sealing even without lowering the surface roughness of the embossed surface during low-temperature laminating.

The embossed surface may include fine irregularities.

The fine irregularities may be formed in the peak of the embossed pattern and may be formed in the valley of the embossed pattern.

In the process of forming the embossing, by applying a method of further processing a fine pattern on one side of the film for bonding or additional processing of a fine pattern on the surface of a mold or roller that transfers the embossing, the embossed side can have the characteristics described above. Specifically, the fine pattern may be comprised on the surface of the film for bonding by further processing the fine pattern on a mold or roller for transferring the embossing to the film for bonding and transferring the pattern to the surface of the film for bonding using the mold or roller. For example, fine patterns may be further processed by fine sandblasting on a mold or roller. However, the method of further processing for the fine pattern is not limited thereto.

Figure 2:
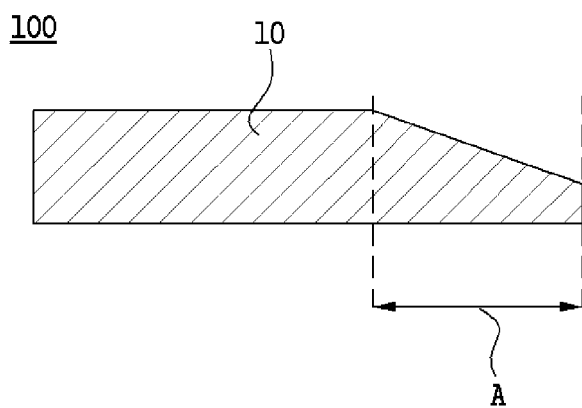
Figure 3:
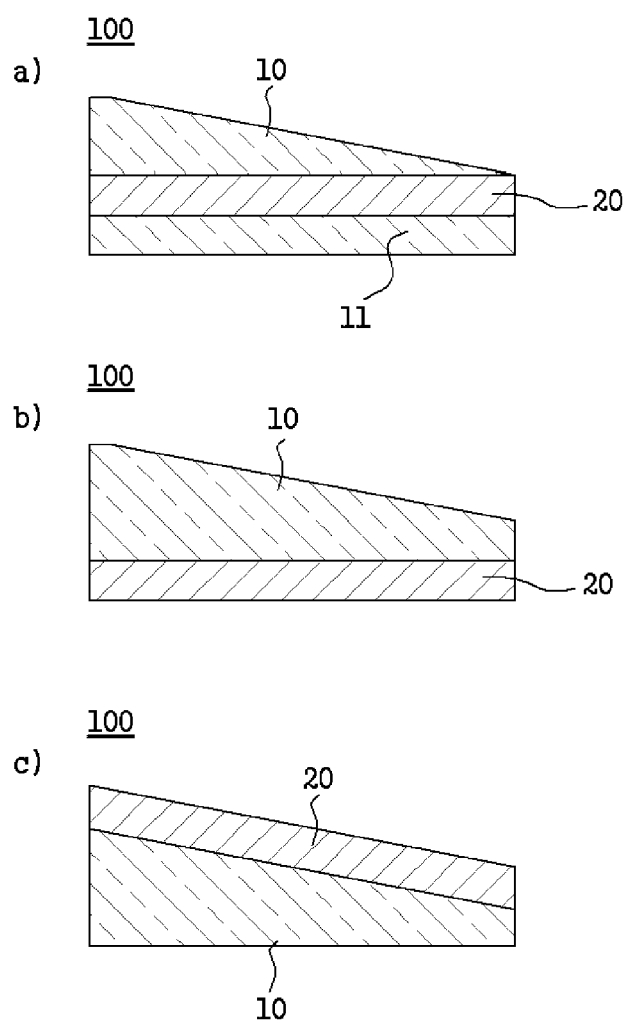
FIG. 3 is a cross-sectional view schematically showing films for bonding including a sound insulation layer according to another embodiment in a), b) and c).

FIGS. 1 and 2 are respectively cross-sectional views schematically showing a film for bonding according to an embodiment. FIG. 3 is a cross-sectional view schematically showing films for bonding including a sound insulation layer according to another embodiment in a), b) and c). Hereinafter, with reference to FIGS. 1 to 3, Embodiments are described more detail.

A film for bonding 100 comprises an embossed surface whose A2/A1 value is 1 or less and comprises a thickness increasing area A.

The thickness increasing area A has both ends which are one end and the other end when viewed from the cross section, and a thickness of the one end is different from a thickness of the other end.

The thickness increasing area A can increase in thickness from one end to the other end. The thickness can be increased at a constant rate throughout the thickness increasing area A. The thickness can increase in an overall gradually increasing rate of the thickness increasing area A. The increase in the thickness can be increased at a rate that gradually decreases throughout the thickness increasing area A.

The thickness increasing area A can decrease in thickness from one end to the other end. The thickness can be decreased at a constant rate throughout the thickness increasing area A. The thickness can decrease in an overall gradually increasing rate of the thickness increasing area A. The increase in the thickness can be decreased at a rate that gradually decreases throughout the thickness increasing area A.

The thickness increasing area A has adjusted angle of the transmitted light or the reflected light, through the ends having the different thickness. Therefor it brings for a light-transmitting laminate to prevent gaining a dual image when the light is irradiated from the light source of the head-up display system.

The thickness increasing area A has a wedge angle (θ), the wedge angle (θ) is calculated by below Equation 3, and the wedge angle of the thickness increasing area A may be 0.01 to 0.04°.

$$\theta = \arctan\left(\frac{Hb - Ha}{w}\right)$$ [Equation 3]

wherein in the Equation 3, the Hb is a thickness of thicker one between the one end and the other end of the thickness increasing area A, the Ha is a thickness of thinner one between the one end and the other end of the thickness increasing area A, and the w is a width from the one end to the other end of the thickness increasing area A.

The Hb value and the Ha value, the center thickness and average thickness, can be measured by using a Mitsubishi® 547-401 thickness gauge, but is not limited thereto.

The wedge angle of the thickness increasing area A may be 0.01° or more. The wedge angle of the thickness increasing area A may be 0.04° or less. The wedge angle of the thickness increasing area A may be 0.011° or more. The wedge angle of the thickness increasing area A may be 0.03° or less. The film for bonding having the wedge angle can efficiently suppress double image formation when used it as intermediate film for a head-up display.

A ratio of the Hb to the w may be 0.001 or more and 0.002 or less.

A ratio of the Ha to the w may be 0.0002 or more and 0.0015 or less.

A specific measurement method of the Ha value and the Hb value is the same as the method described above.

In detail, the Ha value may be 0.38 mm or more. In addition, the Ha value may be 0.40 mm or more. When the Ha value is greater than 0.38 mm, the film for bonding can have a stable penetration resistance.

The ratio of Hb to W may be 0.001 or more and 0.002 or less. In addition, the ratio of Hb to W can be 0.001 or more and 0.0018 or less. When the ratio of W to Hb is within the above range, it is possible to provide a film for bonding having excellent impact resistance and penetration resistance and having a double image preventing function.

The ratio of Ha to W may be 0.0002 or more and 0.0015 or less. In addition, the ratio of Ha to W can be 0.0003 or more and 0.0013 or less. When the ratio of Ha to W is in the above range, it is possible to provide a film for bonding having both penetration resistance and double image prevention function at the same time.

The thickness increasing area A may be disposed at a part or all of the film for bonding 100.

When the thickness increase area A is disposed in a part of the film for bonding 100, the thickness increase area A can be disposed at the side of the film for bonding 100.

The film for bonding 100 may comprise one or two or more thickness increasing area A.

A film for bonding 100 comprises an embossed surface having a regular pattern or an irregular pattern. The embossed surface has a Mr1 value and a Mr2 value. A rev_Mr2 value is a value of subtracting the Mr2 value from 100%. The embossed surface has a Mr1 value which is equal to or greater than the rev_Mr2 value. The film for bonding A comprises a thickness increasing area A.

The thickness increasing area A is omitted because they overlap the above-described contents.

The film for bonding 100 may be a single layer film or a laminated film with two or more layers.

The film for bonding 100 may comprise a polyvinyl acetal resin, and may comprise a polyvinyl acetal resin and a plasticizer.

Specifically, the film for bonding may comprise a polyvinyl acetal resin in an amount of 60 to 76 wt %, 70 to 76 wt %, or 71 to 74 wt %. When comprising the polyvinyl acetal resin in such a range, a film for bonding may achieve relatively high tensile strength and modulus.

The polyvinyl acetal resin may have an acetyl group in an amount of less than 2 wt %, and specifically, in an amount of 0.01 or more and less than 1.5 wt %. A polyvinyl acetal resin may have a hydroxyl group in an amount of 15 wt % or more, 16 wt % or more, or 19 wt % or more. Also, a polyvinyl acetal resin applied to the first layer may have a hydroxyl group in an amount of 30 wt % or less.

When a polyvinyl acetal resin having such a characteristic is applied to the film for bonding, the film can be excellently bonded to a material such as glass and can have mechanical properties such as proper penetration resistance.

The polyvinyl acetal resin may be a polyvinyl acetal resin obtained by acetalization of a polyvinyl alcohol having a polymerization degree of 1,600 to 3,000 with aldehyde, or may be a polyvinyl acetal resin obtained by acetalization of a polyvinyl alcohol having a polymerization degree of 1,700 to 2,500 with aldehyde. When such a polyvinyl acetal is applied, mechanical properties like penetration resistance of the film can be sufficiently improved.

The polyvinyl acetal resin may be one synthesized from polyvinyl alcohol and aldehyde, and the aldehyde is not limited in the type. Specifically, the aldehyde may be any one selected from the group consisting of n-butyl aldehyde, isobutyl aldehyde, n-valer aldehyde, 2-ethyl butyl aldehyde, n-hexyl aldehyde, and blend resins thereof. When n-butyl aldehyde is applied as the aldehyde, the produced polyvinyl acetal resin may have a refractive characteristic with a small difference in refractive index of glass, and a characteristic in excellent adhesion with glass and the like.

The film for bonding may comprise a plasticizer in an amount of 24 to 40 wt %, 24 to 30 wt %, or 26 to 29 wt %. The film comprising the plasticizer in such a range is preferable in that a laminated film for bonding can achieve a proper adhesive strength and impact resistance.

Specifically, the plasticizer may be any one selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and mixtures thereof. Specifically, any one selected from the group consisting of triethylene glycol di-2-ethyl butyrate, triethylene glycol di-2-ethylhexanoate, triethylene glycol di-n-heptanoate, and compositions thereof may be comprised as the first plasticizer, and further specifically, triethylene glycol bis 2-ethylhexanoate (3G8) may be applied.

The film for bonding may further comprise an additive as needed, and for example, the additive may be any one selected from the group consisting of an antioxidant, a heat stabilizer, a UV absorber, a UV stabilizer, an IR absorber, a glass adhesion control agent, and combinations thereof.

As the antioxidant, a hindered amine-based antioxidant or a hindered phenol-based antioxidant may be used. Specifically, on the process of manufacturing polyvinyl butyral (PVB) which needs a processing temperature of 150° C. or higher, a hindered phenol-based antioxidant is further preferable. The hindered phenol-based antioxidant may be for example, IRGANOX 1076, 1010, or so on available from BASF SE.

As the heat stabilizer, a phosphite-based heat stabilizer may be used considering suitability with an antioxidant. For example, the heat stabilizer may be IRGAFOS 168 available from BASF SE.

As the UV absorber, Chemisorb 12, Chemisorb 79, Chemisorb 74, or Chemisorb 102 available from CHEMIPRO KASEI KAISHA, LTD may be used, or Tinuvin 328, Tinuvin 329, or Tinuvin 326 available from BASF SE may be used. As the UV stabilizer, Tinuvin available from BASF SE may be used. As the IR absorber, ITO, ATO, or AZO may be used, and as the glass adhesion control agent, a metal salt such as magnesium (Mg), potassium (K), sodium (Na), epoxy-based modified silicon (Si) oil, or a mixture thereof may be used, but the present application is not limited thereto.

The film for bonding 100 is a multilayer film. The film for bonding 100 may be a laminate with two or more layers. The film may be a laminate with three or more layers, or a laminate with five or more layers. The multilayer film may comprise a bonding layer 10, 11 in direct contact with a light transmitting laminate such as a glass plate and a core layer (not presented in drawing) distinct from the bonding layer. The core layer may comprise functionality, and for example, may have functionality such as sound insulating functionality, heat insulating functionality, and the like.

The multilayer film comprising a bonding layer 10, 11 may have at least one layer comprising a polyvinyl acetal resin composition corresponding to a composition of the single layer described in the above. The multilayer film may comprise a polyvinyl acetal resin and a plasticizer. Descriptions of the polyvinyl acetal resin and the plasticizer are overlapped with the above description and thus the further description is omitted.

The film for bonding 100 may comprise a sound insulation layer 20. The sound insulation layer 20 may be disposed between the bonding layers 10, 11 and may be disposed on one surface of the bonding layers 10.

The sound insulation layer 20 may comprise a polyvinyl acetal resin.

The sound insulation layer 20 may comprise a polyvinyl acetal resin in an amount of 54 to 76 wt %, or 60 to 70 wt %.

The sound insulation layer 20 may comprise a plasticizer in an amount of 24 wt % or more and 46 wt % or less, or 30 wt % or more and 40 wt % or less.

The polyvinyl acetal resin comprised in the sound insulation layer 20 may have an acetyl group in an amount of 8 wt % or more, and specifically, in an amount of 8 wt % or more and 30 wt % or less. A polyvinyl acetal resin comprised in the sound insulation layer 20 may have a hydroxyl group in an amount of 26 wt % or less, or 5 wt % or more and 25 wt % or less. In this case, a stable sound insulation property can be imparted to the film for bonding 100.

The film for bonding 100 may be manufactured to be a sheet shape by extruding a composition for manufacturing a film for bonding comprising a resin and a plasticizer, with an additive as needed and shaping the composition through a T-die or the like. When the film for bonding is a multilayer film, a laminating means like a feed block may be further applied to the front end of the T-die.

The film for bonding manufactured to be a sheet shape may be manufactured into a film for bonding through processes such as thickness control, embossment formation, and the like, but the manufacturing method for a film for bonding is not limited to such a method.

When the film for bonding 100 has the characteristics of the embossed surface and the characteristics of the thickness increasing area A at the same time, the film for bonding 100 has a double-image prevention function along with the stable surface bonding property.

In particular, when the thickness increasing area A is partially comprised in the film for bonding 100, a bent portion, which rapidly changes the surface angle of the film for bonding 100, is occurred. Bubbles can be easily generated at this portion when the thickness increasing area A is laminated to a light transmission body such as a glass plate. However, the film for bonding of the embodiment is capable of providing a film for bonding having excellent optical properties and excellent double-image prevention functionality by controlling the generation of bubbles on the entire film for bonding comprising the bent portion.

Figure 4:
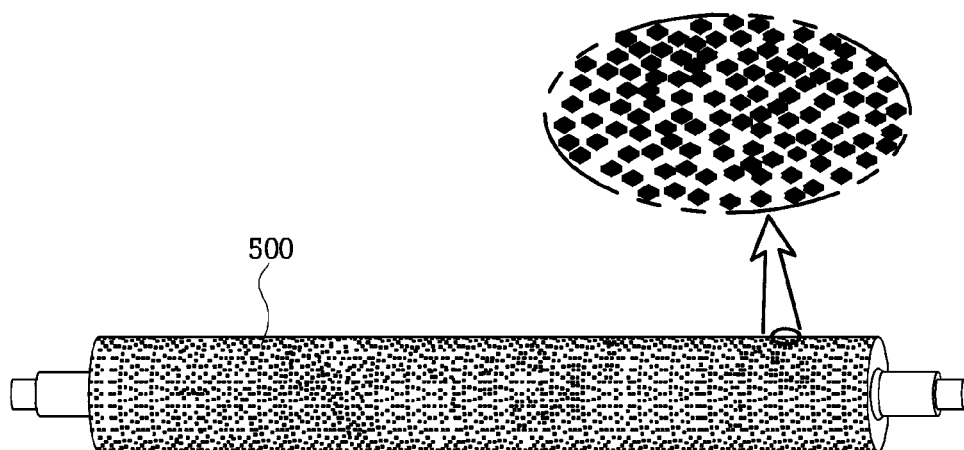
FIG. 4 is a conceptual diagram illustrating an embossing roller applied in a manufacturing process of a film for bonding as a comparative example.
Figure 5:
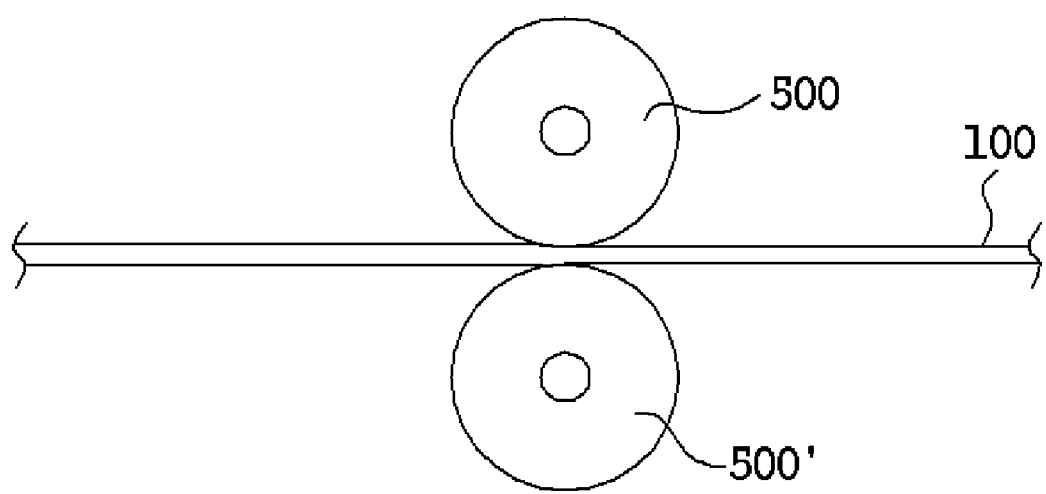
FIG. 5 is a conceptual diagram illustrating a process of preparing a surface embossing in manufacturing method of a film for bonding according to one embodiment.

FIG. 4 is a conceptual diagram illustrating an embossing roller applied in a manufacturing process of a film for bonding as a comparative example. FIG. 5 is a conceptual diagram illustrating a process of preparing a surface embossing in a manufacturing method of a film for bonding according to one embodiment. Hereinafter, with reference to FIGS. 4 to 5, a method for manufacturing a film for bonding with the embossed surface of embodiment are described more detail.

A single-layered film or multilayer film 100 is manufactured in a sheet shape by the same method as described above, and an embossing roller 500 or a mold (not shown) is applied to form an embossed surface of the film, and a film for bonding 100 is manufactured.

The surface characteristics of the embossing roller 500 or the mold are typically applied to the surface of the single-layered film or the multilayer film by applying a method for pressing the surface of the embossing roller 500 or the mold, wherein the transfer rate can be greater than or equal to 0.6, can be greater than or equal to 0.7, and can be less than or equal to 0.99. The transfer rate is evaluated as a surface roughness of a corresponding film surface when the surface roughness of the embossing is viewed as 1.

The surface characteristics of the embossing roller 500 or the mold are usually applied to the surface of the single-layered film or the multilayer film by applying a method for pressing the surface of the embossing roller 500 or the mold, and thus the surface characteristics of the embossing roller or the mold can be controlled to control the characteristics of the embossed surface of the film.

The embossing roller 500 or the mold can be manufactured by a method such as a grit blast process in a concave part of a base roller or a mold (applied to Comparative Example 1) as shown in FIG. 4, and grinding the convex part. At this time, the surface characteristics can be controlled by adjusting the condition (particle size, injection pressure, spray distance, spray angle, etc.) applied during the grit blast treatment and the condition (grinding degree) applied during the grinding process, which is complementarily reflected to the characteristics of the embossed surface of the film.

For Example, to the concave portion of a base roller with matte pattern embossment of Rz roughness of 30 to 90 um, 1 to 10 times of grit blast treatment can be applied which applies particles with an average outer diameter of 3 to 8 um at a distance of 40 to 45 cm with injection pressure of 0.3 to 0.5 MPa by direct pressure method, with the angle of nozzle of 85 to 105 degree. A fine pattern is formed on the convex portion of the film surface to relatively increase the volume of the convex portion of the film surface through the grit blast treatment of the concave portion.

In addition, the convex portion of the base roller can be ground, and the grinding thickness can be applied to 1 to 10 um, preferably 3 to 5 μm. Through the grinding process of the convex portion, voids between concave portions of the surface of the film can be narrowed, and deairing stability can be improved.

The grid blast treatment and the grinding process can be repeated 1 to 10 times.

As another example, to the concave portion of a base roller with matte pattern embossment of Rz roughness of 30 to 90 um, a grid blast treatment can be applied in 1 to 10 times with particles of an average outer diameter of 3 to 8 um in a direct pressure manner with a spray pressure of 0.3 to 0.5 MPa at a distance of 15 to 20 cm, and an angle of the nozzle is applied at 85 to 105 degrees. A fine pattern is formed on the convex portion of the film surface to relatively increase the volume of the convex portion of the film surface through the grit blast treatment of the concave portion.

In addition, the convex portion of the base roller can be ground, and the grinding thickness can be 1 to 10 urn, preferably 3 to 5 urn. Through the grinding process of the convex portion, voids between concave portions of the surface of the film can be narrowed, and deaeration stability can be improved.

The grid blast treatment and the grinding process can be repeated 1 to 10 times.

As another example, a shot blast treatment proceeding by applying to a surface of a base mold or a roller of a mat pattern type with Rz roughness of 30 to 90 urn with particles of an average outer diameter of 50 urn at a distance of 15 to 20 cm to a spray pressure of 0.4 MPa by the spray angle of 90° in 1 time. A fine pattern is formed on the surface of the film complementarily through shot blast processing to adjust the depth distribution of the valley of the surface of the film.

In addition, a grit blast treatment proceeding can be applied 1 to 10 times to the surface of the basic mold or the roller with particles of an average outer diameter of 5 urn applied in a direct pressure manner at a distance of 15 to 20 cm with spray pressure of 5 to 10° and an angle of the nozzle applied to 5 to 10 degrees. The bonding force of the film for bonding can be improved by etching a part protruding excessively in the film surface pattern through the grit blast treatment.

A light transmitting laminate according to another embodiment disclosed in the present specification comprises a first light transmitting layer; a film for bonding placed on one surface of the first light transmitting layer; and a second light transmitting layer placed on the film for bonding.

The first light transmitting layer and the second light transmitting layer may be respectively independently a light transmitting glass or a light transmitting plastic.

A film for bonding described in the above is applied as the film for bonding, the detailed description thereof is overlapped with the above description, and thus the further description is omitted.

The total number of bubbles counted by 3 light-transmitting laminates with a length of 300 mm and a width of 300 mm may be 5 or less. Detailed description on the measuring conditions and measuring method of the number of bubbles in the light-transmitting laminates are overlapped with the description of below, and thus the description thereof is omitted.

One selected from the group consisting of the first transmission layer, the second transmission layer, and a combination thereof in the light-transmitting laminate may be aged glass.

In case of a common glass, it is possible to reduce the edge sealing property as a scale is occurred on the surface according to the temperature and humidity of the atmosphere. Specifically, by applying aged glass to the light-transmitting layer (the first light-transmitting layer or the second light-transmitting layer) for a predetermined period in a specific temperature and a specific relative humidity, scale occurring is induced on the surface and then applied to the manufacture of the light-transmitting laminate, thereby checking whether the film for bonding has excellent edge sealing characteristics even under severe conditions.

The aging can be carried out by located a glass for 60 days under a condition of 25° C. and 40 RH %.

A light-transmitting laminate has an excellent edge sealing property even though the aged glass is applied, and it is considered that enhanced effects can be obtained through controlling the surface characteristics of a film for bonding of the embodiment.

A vehicle according to another embodiment disclosed in the present specification comprises a light transmitting laminate described above. The vehicle comprises a body forming a main body of the vehicle, a driving part (engine, etc.)

attached to the body, a drive wheel attached to be rotatable to the body, a connector connecting the drive wheel and the driving part; and a windshield attached to a part of the body, which is a light transmitting laminate for blocking wind from outside.

Hereinafter, detailed embodiments will be described in further detail. In below descriptions of experiments, a case on % described without being obvious whether the unit is wt % or mol % refers to wt %.

Manufacture Example 1: Processing of Roller

An additive minute pattern was formed on the concave portion of a steel roller having an embossed form which is a matte pattern in which dots are randomly formed, and grinding treatment was performed on the convex portion of the steel roller.

As expressed in FIG. 4, a roller having random irregularities of a matte pattern shape (Rz=50 μm) was applied as ROLL 0.

A roller as the same as the ROLL 0 was treated with grit blasting for the concave portion thereof and treated with griding for the convex portion thereof, and in this manner, ROLL 1a, ROLL 1b, and ROLL 1c were respectively manufactured. Specifically, the concave portion (valley) of the matte pattern was treated with grit blast, and the concave portion (peak) of the matte pattern was treated with grinding. The grit blast treatment was performed by injecting particles with an average diameter of 5 μm after passing an impurity removing filter with 200 mesh at a distance of 40 to 45 cm and an injecting pressure of 0.4 MPa with a direct air blast system. The angle between the mold surface and injected particles (or a nozzle) was 85 to 105 degrees.

ROLL 1a was treated with the above grit blast and griding treatment one time, and ROLL 1b was treated with the above grit blast and griding treatment three times. And ROLL 1c was treated with the grit blast and grinding treatment ten times.

The rollers manufactured in this manner were applied to Examples or Comparative Examples as indicated in Table 1 below.

Manufacture Example 1: Manufacture of Film

Hereinafter, respective ingredients used in Examples and Comparative Examples are the same as below.

Polyvinyl Butyral Resin (A1): PVA having a polymerization degree of 1700 and a saponification degree of 99 and n-BAL were added to perform an ordinary synthesizing process, and thereby a polyvinyl butyral resin having a hydroxyl group of 20.3 wt %, a butyral group of 78.9 wt %, and an acetyl group of 0.8 wt % was obtained.

Manufacture of Additive: Irganox1076 as an antioxidant of 0.1 wt %, TINUVIN-328 as a UV absorber of 0.2 wt %, and Mg Acetate as an adhesion control agent of 0.03 wt % were blended and mixed in a tumbler to be sufficiently dispersed (A total amount of 0.33 wt %).

Examples 1 to 3: The polyvinyl butyral resin (A1) of 72.67 wt %, 3g8 as a plasticizer of 27 wt % and an additive of 0.33 wt % were added to one twin-screw extruder (a) and manufactured into a film through a T-DIE, subsequently, respective different rollers (ROLL 1a, ROLL 1b, and ROLL 1c) were used before the film was winded, to perform embossing treatment, and a film in which a surface pattern was transferred was sampled in a form of a roll sample, thereby manufacturing films of Examples 1 to 3. The manufactured film had a thickness of 760 μm and a width of 1.0 M.

Comparative Example 1: The film of Comparative Example 1 was manufactured under the same condition as the above Examples 1 to 3, excepting for being manufactured by using a roller which is not additively processed for a minute pattern of the convex portion and the concave portion (ROLL 0) to perform embossing treatment.

Evaluation Example: Evaluation of Properties

Measurement of Surface Roughness 3D roughness was measured through a measuring device, and A1 value and A2 value were obtained respectively according to ISO_25178. In detail, 3D roughness was measured by using a non-contact type optical microscopy available from BRUKER (model Contour GT), at VSI (Vertical scanning Interferometry) mode.

In detail, the 3D roughness values were measured by using 2× ocular lens and 5× objective lens. In this time, the area with a length of x axis from 0 to 0.887 m and a length of y axis from 0 to 0.670 mm could be scanned. The measurement was repeated five times by designing a measuring area randomly from the same pattern, and three measured values were averaged to obtain a value of the measurement.

Sz, A1 (peak area), A2 (valley area) and A2/A1 values as the result of the measurement were shown in Table 1 below.

Evaluation of Edge Sealing

Manufacture of Samples for Evaluation 1) Samples of Examples and Comparative Example were cut into width*length of 1000*1000 mm, and left for two days at 20 degrees and 20 rh % to be aged. A sample was picked to be 300*300 mm based on the center of the film in the width direction, and three samples were cut in the length direction as the same manner.

The samples were placed between two pieces of plate glass with a thickness of 2.1 T (T=mm) to be pre-laminated, and respective three samples for evaluation of each Example and Comparative Example were manufactured.

Each sample for evaluation had width*length of 300*300 mm, in which the one sample had a total length of four edges of 1200 mm, respective three samples for evaluation of each Example and Comparative Example were prepared, and edge sealing thereof was evaluated in total 3.6 m.

Pre-laminating process was performed by de-airing using a vacuum ring for 5 minutes at 20° C. and maintaining at three other temperature zones of respective 70° C., 85° C. and 100° C. for 15 minutes.

Manufacture of Samples for Evaluation 2) glass plate in a thickness of 2.1 T was cut into width*length of 300*300 mm, and left for 60 days under the condition of 25° C. and 40 rh % to be aged. While a sample for evaluation was manufactured in the same manner as the Manufacture of Samples for Evaluation 1), the temperature for maintaining after de-airing was applied to be 85° C.

Evaluation for Edge Sealing Degree) The samples for evaluation were evaluated by naked eyes, when a sample had perfect edge sealing and a pattern not at all shown, it was evaluated as 5 points, when a sample had good edge sealing degree and a pattern weakly identified by naked eyes, it was evaluated as 4 points, when a sample had normal edge sealing degree and a pattern identified by naked eyes, it was evaluated as 3 points, when a sample had bad edge sealing degree and a pattern identified by naked eyes, it was evaluated as 2 points, and when a sample had bad edge sealing degree and a pattern strongly identified by naked eyes, it was evaluated as 1 point. Total points of scores of respective three samples were shown in Table 2.

Evaluation of Bubble Occurrence

The samples for evaluation of Examples and Comparative Examples after being pre-laminated was pressed for 20 minutes under the condition of 140° C. and 1.2 MPa in an autoclave, and thereby a laminated glass after being mainly laminated was obtained. The time used in the main lamination comprising a heating time and a cooling time was total 90 minutes.

The bubble number occurring in the laminated glass after being mainly laminated was ascertained by naked eyes. When the sum of bubble numbers ascertained in three samples of each Example and Comparative Example was 5 or less, it was noted as 5 points, when the sum of bubble numbers was 6 to 10, it was noted as 3 points, when the sum of bubble numbers was 11 or more, it was noted as 1 point and the result was shown in Table 2.

TABLE 1

| | Used Roller | The Result of Surface Roughness Measurement | | | |
|---|---|---|---|---|---|
| | | Sz(μm) | A1 | A2 | A2/A1 |
| Comparative Example1 | ROLL 0 | 50.8 | 0.3 | 1.1 | 3.57 |
| Example1 | ROLL 1a | 48.9 | 0.9 | 0.3 | 0.37 |
| Example2 | ROLL 1b | 48.6 | 0.6 | 0.5 | 0.82 |
| Example3 | ROLL 1c | 48.2 | 1.2 | 0.1 | 0.09 |

TABLE 2

| | | Evaluation for Edge Sealing | | Evaluation of Bubble Occurrence Score of |
|---|---|---|---|---|
| | Glass Type | Temperature of Prelamination | Score of Prelamination Evaluation | Bubble Occurrence Evaluation |
| Comparative Example 1 | Ordinary Glass | 100° C. | 15 | 5 |
| | | 85° C. | 10 | 3 |
| | | 70° C. | 4 | 1 |
| | Aged Glass | 85° C. | 5 | 1 |
| Example 1 | Ordinary Glass | 100° C. | 15 | 5 |
| | | 85° C. | 14 | 5 |
| | | 70° C. | 12 | 5 |
| | Aged Glass | 85° C. | 13 | 5 |
| Example 2 | Ordinary Glass | 100° C. | 14 | 5 |
| | | 85° C. | 13 | 5 |
| | | 70° C. | 12 | 5 |
| | Aged Glass | 85° C. | 13 | 5 |
| Example 3 | Ordinary Glass | 100° C. | 15 | 5 |
| | | 85° C. | 13 | 5 |
| | | 70° C. | 12 | 5 |
| | Aged Glass | 85° C. | 12 | 5 |

With reference to the Table 1, Sz values of Examples 1 to 3 in which a minute pattern is additionally processed by grit blast and grinding on the roller surface had a difference value of 2.6 μm as the maximum, when compared to the Sz value of Comparative Example 1, and thereby it could be known that the value of surface roughness Sz was not greatly changed even though an additional processing of minute pattern was performed on the roller surface. In addition, in the cases of Examples 1 to 3, A2/A1 value was measured to be less than 1, however, in the case of Comparative Example 1 in which an additional processing of minute pattern was not performed, A2/A1 value was measured to be 3.57 and exhibited a considerably great difference.

With reference to the Table 2, the cases of Examples obtained a score of 12 or more under all the conditions, however, the case of Comparative Example 1 obtained a score of 5 or less in a sample pre-laminated with ordinary glasses at 70° C. and a sample pre-laminated with aged glasses at 85° C., and thereby it could be known that the edge sealing characteristic of a film was improved when additional processing of a minute pattern was performed on the film.

Additionally, for the evaluation of bubble occurrence, the cases of Examples obtained 5 points under all the conditions, however, the case of Comparative Example 1 obtained a score of 3 or less except for the case of a sample pre-laminated with an ordinary glass at 100° C., and thereby it could be known that when additional processing of a minute pattern was performed on a film, deairing stability of the film was improved.

Manufacture Example 2: Processing of Roller

An additional minute pattern was formed on the concave portion of a steel roller having an embossment form, which is a matte pattern in which dots were randomly formed, and for the convex portion, grinding treatment was performed.

A roller (Rz=50 μm) having irregularities in the shape of a matte pattern as expressed in FIG. 4 was applied as ROLL 0.

ROLL 2a, ROLL 2b, and ROLL 2c were respectively manufactured by grit blast treatment for the concave portion and grinding treatment for the convex portion in the same roller as ROLL 0. Specifically, the concave portion of the matte pattern was treated with grit blast, and the convex portion of the matte pattern was treated with grinding. The grit blast treatment was operated by injecting particles filtered out by an impurity removing filter with 200 mesh having an average outer diameter of 5 μm using a direct air blast method in a distance of 15 to 20 cm and an injection pressure of 0.4 MPa. The angle between a matte pattern surface and injected particles (or a nozzle) was 85 to 105 degrees.

ROLL 2a was processed with the above grit blast and grinding treatment one time, ROLL 2b was repetitively processed with the above grit blast and griding treatment two times, and ROLL 2c was repetitively processed with the above grit blast and grinding treatment four times.

The rollers manufactured in this manner were applied to Examples or Comparative Examples as indicated in Table 1 below.

Manufacture Example 2: Manufacture of Film

Hereinafter, respective ingredients used in Examples and Comparative Examples are the same as below.

Polyvinyl Butyral Resin (A1): PVA having a polymerization degree of 1700 and a saponification degree of 99 and n-BAL were added to perform an ordinary synthesizing process, and thereby a polyvinyl butyral resin having a hydroxyl group of 20.3 wt %, a butyral group of 78.9 wt %, and an acetyl group of 0.8 wt % was obtained.

Manufacture of Additive: Irganox1076 as an antioxidant of 0.1 parts by weight, TINUVIN-328 as a UV absorber of 0.2 parts by weight, and Mg Acetate as an adhesion control agent of 0.03 parts by weight were blended and mixed in a tumbler to be sufficiently dispersed (A total amount of 0.33 parts by weight).

Examples 4 to 6: The polyvinyl butyral resin (A1) of 72.67 wt %, 3g8 as a plasticizer of 27 wt % and an additive of 0.33 wt % were added to one twin-screw extruder (a) and manufactured into a film through a T-DIE, subsequently, respective different rollers or conditions of transferring were used to perform embossing treatment as indicated in Table 3 below before the film was winded, and a film in which a surface pattern was transferred was sampled in a form of a roll sample, thereby manufacturing films of Examples 4 to 6. As the transferring condition, the pressure condition was applied as the above, but the temperature condition was applied as indicated Table 3. The manufactured film had a thickness of 760 μm and a width of 1.0 M.

Comparative Example 2: The film of Comparative Example 2 was manufactured under the same condition as the above Example 4, excepting for being manufactured by using a roller which is not additively processed for a minute pattern of the convex portion and the concave portion (ROLL 0) to perform embossing treatment.

Evaluation Example 2: Evaluation of Properties

Measurement of Surface Roughness 3D roughness was measured through a measuring device, and Mr1 value and Mr2 value were obtained respectively according to ISO_25178. In detail, 3D roughness was measured by using a non-contact type optical microscopy available from BRUKER (model Contour GT), at VSI (Vertical scanning Interferometry) mode.

In detail, the 3D roughness values were measured by using 2× ocular lens and 5× objective lens. In this time, the area with a length of x axis from 0 to 0.887 m and a length of y axis from 0 to 0.670 mm could be scanned. The measurement was repeated five times by designing a measuring area randomly from the same pattern, and three measured values were averaged to obtain a value of the measurement.

Sz, Mr1, Mr2, rev_Mr2, and Mr-rev_Mr2 values calculated from the measured result of the measurement were shown in Table 3 below.

Evaluation of Edge Sealing

Manufacture of Samples for Evaluation 1) Films of Examples and Comparative Example were cut into width*length of 1000*1000 mm, and left for two days at 20 degrees and 20 rh % to be aged. A sample was picked to be 300*300 mm based on the center of the film in the width direction, and three samples were cut in the length direction as the same manner.

The samples were placed between two pieces of glass plate with a thickness of 2.1 T (T=mm, the same as below) to be pre-laminated, and respective three samples for evaluation of each Example and Comparative Example were manufactured.

Each sample for evaluation had width*length of 300*300 mm, in which the one sample had a total length of four edges of 1200 mm, respective three samples for evaluation of each Example and Comparative Example were prepared, and edge sealing thereof was evaluated in total 3.6 m.

Pre-laminating process was performed by de-airing using a vacuum ring for 5 minutes at 20° C. and maintaining at three other temperature zones of respective 70° C., 85° C. and 100° C. for 15 minutes.

Manufacture of Samples for Evaluation 2) glass plates in a thickness of 2.1 T was cut into width*length of 300*300 mm, and left for 60 days under the condition of 25° C. and 40 rh % to be aged. While a sample for evaluation was manufactured in the same manner as the Manufacture of Samples for Evaluation 1), the temperature for maintaining after deairing was applied to be 85° C.

Evaluation for Edge Sealing Degree) The samples for evaluation were evaluated by naked eyes, when a sample had perfect edge sealing and a pattern not at all shown, it was evaluated as 5 points, when a sample had good edge sealing degree and a pattern weakly identified by naked eyes, it was evaluated as 4 points, when a sample had normal edge sealing degree and a pattern identified by naked eyes, it was evaluated as 3 points, when a sample had bad edge sealing degree and a pattern identified by naked eyes, it was evaluated as 2 points, and when a sample had bad edge sealing degree and a pattern strongly identified by naked eyes, it was evaluated as 1 point. Total points of scores of respective three samples were shown in Table 4.

Evaluation of Bubble Occurrence

The samples for evaluation of Examples and Comparative Examples after being pre-laminated was pressed for 20 minutes under the condition of 140° C. and 1.2 MPa in an autoclave, and thereby a laminated glass after being mainly laminated was obtained. The time used in the main lamination comprising a heating time and a cooling time was total 90 minutes.

The bubble number occurring in the laminated glass after being mainly laminated was ascertained by naked eyes. When the sum of bubble numbers ascertained in three samples of each Example and Comparative Example was 5 or less, it was noted as 5 points, when the sum of bubble numbers was 6 to 10, it was noted as 3 points, when the sum of bubble numbers was 11 or more, it was noted as 1 point and the result was shown in Table 4.

TABLE 3

| | Transferring Condition | | The Result of 3D Roughness Measurement | | | | |
|---|---|---|---|---|---|---|---|
| | Used Roller | Transferring Temperature (° C.) | Sz (um) | Mr1 (%) | Mr2 (%) | Rev_ Mr2 (%) | Mr1-rev_ Mr2 (%) |
| Comparative Example 2 | ROLL 0 | 115 | 59 | 9.8 | 88.9 | 11.1 | −1.3 |
| Example 4 | ROLL 2a | 115 | 57 | 13.1 | 89.9 | 10.1 | 3.0 |
| Example 5 | ROLL 2b | 115 | 55 | 13.2 | 93.2 | 6.8 | 6.4 |
| Example 6 | ROLL 2c | 115 | 54 | 14.6 | 98.0 | 2.0 | 12.6 |

TABLE 4

| | Glass Type | Evaluation of Edge Sealing | | Evaluation of Bubble Occurrence Score of Bubble Occurrence Evaluation |
|---|---|---|---|---|
| | | Temperature of Prelamination | Score of Prelamination Evaluation | |
| Comparative Example 2 | Ordinary Glass | 100° C. | 15 | 5 |
| | | 85° C. | 9 | 3 |
| | | 70° C. | 5 | 1 |
| | Aged Glass | 85° C. | 5 | 1 |
| Example 4 | Ordinary Glass | 100° C. | 14 | 5 |
| | | 85° C. | 13 | 5 |
| | | 70° C. | 12 | 5 |
| | Aged Glass | 85° C. | 12 | 5 |
| Example 5 | Ordinary Glass | 100° C. | 15 | 5 |
| | | 85° C. | 14 | 5 |
| | | 70° C. | 12 | 5 |
| | Aged Glass | 85° C. | 12 | 5 |
| Example 6 | Ordinary Glass | 100° C. | 15 | 5 |
| | | 85° C. | 15 | 5 |
| | | 70° C. | 13 | 5 |
| | Aged Glass | 85° C. | 13 | 5 |

With reference to Table 3, Sz values of Examples 4 to 6 in which a minute pattern is additionally processed by grit blast and grinding on the roller surface had a difference value of 5 μm as the maximum, when compared to the Sz value of Comparative Example 2, and thereby it could be known that the value of surface roughness Sz was not greatly changed even though a minute pattern was additionally processed on the roller surface.

In addition, in the cases of Examples 4 to 6, Mr1-rev_Mr2 value was measured to be more than 3.0, however, in the case of Comparative Example 2 in which a minute pattern was not additionally processed, Mr1-rev_Mr2 value was measured to be −1.3. When additional processing of a minute pattern was treated on the roller surface, the density distribution of protruding valley in the valley portion of the surface of the manufactured film could be relatively decreased and the value of peak valley distribution could be increased. In this case, the edge sealing characteristic verified in the prelamination characteristic could be further improved.

With reference to the Table 4, in the edge sealing evaluation, the cases of Examples 4 to 6 obtained a score of 12 or more under all the conditions, however, the case of Comparative Example 2 obtained a score of 5 or less in a sample pre-laminated with ordinary glasses at 70° C. and a sample pre-laminated with aged glasses at 85° C., and thereby it could be known that the edge sealing characteristic of a film was improved when additional processing of a minute pattern was performed on the film.

Additionally, for the evaluation of bubble occurrence, the cases of Examples 4 to 6 obtained 5 points under all the conditions, however, the case of Comparative Example 2 obtained a score of 3 or less except for the case of a sample pre-laminated with ordinary glasses at 100° C., and thereby it could be known that when additional processing of a minute pattern was performed on a film, deairing stability of the film was improved.

It could be also verified that the case of applying aging glasses whose surface was comparatively not even exhibited more excellent result of Examples 4 to 6 compared to Comparative Example 2.

Manufacture Example 3: Processing of Mold

An additional minute pattern was formed on a surface of a steel mold having an embossment form, which is a matte pattern in which dots were randomly formed.

A mold (Rz=50 μm) having irregularities in the shape of a matte pattern was applied as MOLD 0.

MOLD 1 was manufactured by shot blasting and grit blast treatment respectively performed one time to the same roller as ROLL 0. Specifically, the shot blast treatment was operated by injecting particles filtered out by an impurity removing filter with 140 mesh having an average outer diameter of 5 μm using a direct air blast method in a distance of 15 to 20 cm and an injection pressure of 0.4 MPa. The angle between a matte pattern surface and injected particles (or a nozzle) was 90°. The grit blast treatment was operated by injecting particles filtered out by an impurity removing filter with 200 mesh having an average outer diameter of 5 μm using a direct air blast method in a distance of 15 to 20 cm and an injection pressure of 0.4 MPa. The angle of a matte pattern surface and injected particles (or a nozzle) was 5 to 10°.

The mold manufactured in this manner was applied to Examples as indicated in Table 5 below.

Manufacture Example 3: Manufacture of Film

Hereinafter, respective ingredients used in Examples and Comparative Examples are the same as below.

Polyvinyl Butyral Resin (A1): PVA having a polymerization degree of 1700 and a saponification degree of 99 and n-BAL were added to perform an ordinary synthesizing process, and thereby a polyvinyl butyral resin having a hydroxyl group of 20.3 wt %, a butyral group of 78.9 wt %, and an acetyl group of 0.8 wt % was obtained.

Manufacture of Additive: Irganox1076 as an antioxidant of 0.1 parts by weight, TINUVIN-328 as a UV absorber of 0.2 parts by weight, and MgAcetate as an adhesion regulator of 0.03 parts by weight were blended and mixed in a tumbler to be sufficiently dispersed (A total amount of 0.33 parts by weight).

Manufacture of Sheet

Manufacture of Sheet 1: The polyvinyl butyral resin (A) of 72.67 wt %, 3g8 as a plasticizer of 27 wt % and an additive of 0.33 wt % were added to one twin-screw extruder and manufactured into a sheet 1 with an even surface through a T-DIE.

Manufacture of Sheet 2: While manufactured by the same method as the manufacturing method of sheet 1, a die lip cooler was used at 15° C. during the film formation through extruding, and sheet 2 in which a melt fracture was formed on the surface was obtained.

Pattern Transferring on Sheet

Example 7: A pattern was transferred by using MOLD 1 on the surface of the manufactured sheet 1.

Example 8: A pattern was transferred by using MOLD 1 on the surface of the manufactured sheet 2.

Comparative Example 3: A pattern was transferred by using MOLD 0 on the surface of the manufactured sheet 1.

Comparative Example 4: The manufactured sheet 2 was applied without transferring of a pattern.

Evaluation Example 3: Evaluation of Properties

Measurement of Surface Roughness 3D roughness was measured through a measuring device, and Svk, S*vk, A2, and Sz values were obtained respectively according to ISO_25178. The 3D roughness was measured by using a non-contact type optical microscopy available from BRUKER (model Contour GT), at VSI (Vertical scanning Interferometry) mode.

In detail, the 3D roughness values were measured by using 2× ocular lens and 5× objective lens. In this time, the area with a length of x axis from 0 to 0.887 m and a length of y axis from 0 to 0.670 mm could be scanned. The measurement was repeated five times by designing a measuring area randomly from the same pattern, and three measured values were averaged to obtain a value of the measurement.

Svk, S*vk, A2, and Sz values calculated from the result of the measurement were shown in Table 5 below.

Evaluation of Edge Sealing

Manufacture of Samples for Evaluation 1) Films of Examples and Comparative Examples were cut into width*length of 1000*1000 mm, and left for two days at 20 degrees and 20 rh % (relative humidity %) to be aged. A sample was picked to be 300*300 mm based on the center of the film in the width direction, and three samples were cut in the length direction as the same manner.

The samples were placed between two pieces of glass plate with a thickness of 2.1 T (T=mm, the same as below) to be pre-laminated, and respective three samples for evaluation of each Examples and Comparative Example were manufactured.

Each sample for evaluation had width*length of 300*300 mm, in which the one sample had a total length of four edges of 1200 mm, respective three samples for evaluation of each Examples and Comparative Example were prepared, and edge sealing thereof was evaluated in total 3.6 m.

Pre-laminating process was performed by de-airing using a vacuum ring for 5 minutes at 20° C. and maintaining at two other temperature zones of respective 70° C. and 100° C. for 15 minutes.

Evaluation for Edge Sealing Degree) The samples for evaluation were evaluated by naked eyes, when a sample had perfect edge sealing and a pattern not at all shown, it was evaluated as 5 points, when a sample had good edge sealing degree and a pattern weakly identified by naked eyes, it was evaluated as 4 points, when a sample had normal edge sealing degree and a pattern identified by naked eyes, it was evaluated as 3 points, when a sample had bad edge sealing degree and a pattern identified by naked eyes, it was evaluated as 2 points, and when a sample had bad edge sealing degree and a pattern strongly identified by naked eyes, it was evaluated as 1 point. Total points of scores of respective three samples were shown in Table 6.

Evaluation of Bubble Occurrence

The samples for evaluation of Examples and Comparative Examples after being pre-laminated was pressed for 20 minutes under the condition of 140° C. and 1.2 MPa in an autoclave, and thereby a laminated glass after being mainly laminated was obtained. The time used in the main lamination comprising a heating time and a cooling time was total 90 minutes.

The bubble number occurring in the laminated glass after being mainly laminated was ascertained by naked eyes. When the sum of bubble numbers ascertained in three samples of each Example and Comparative Example was 5 or less, it was noted as 5 points, when the sum of bubble numbers was 6 to 10, it was noted as 3 points, when the sum of bubble numbers was 11 or more, it was noted as 1 point and the result was shown in Table 6 below.

Evaluation of Bubble Occurrence in Environment with High Temperature and High Humidity Samples for evaluation of Examples and Comparative Examples after being pre-laminated were left for 120 hours in the environment of 85° C. and 92 rh %, and evaluation of bubble occurrence was performed in the same manner as the above evaluation of bubble occurrence. The evaluation score of each Example and Comparative Example was shown in Table 6 below.

TABLE 5

| | Used Sheet | Used Mold | The Result of 3D Roughness Measurement | | | | | |
|---|---|---|---|---|---|---|---|---|
| | | | Svk (um) | S*vk (um) | DSvk (um) | DSvk/Svk | DSvk/Sz | A2 | Sz (um) |
| Example 7 | Sheet 1 | MOLD 1 | 5.4 | 7.0 | 1.6 | 0.30 | 0.03 | 0.18 | 63.3 |
| Example 8 | Sheet 2 | MOLD 1 | 7.0 | 10.7 | 3.7 | 0.53 | 0.06 | 0.25 | 63.7 |
| Comparative Example 3 | Sheet 1 | MOLD 0 | 3.6 | 9.7 | 6.1 | 1.68 | 0.09 | 0.15 | 64.1 |
| Comparative Example 4 | Sheet 2 | — | 2.5 | 15.9 | 13.4 | 5.35 | 0.21 | 0.06 | 64.0 |

TABLE 6

| | Evaluation of Edge Sealing | | Score of Bubble Occurrence | |
|---|---|---|---|---|
| | Temperature of Prelamination (° C.) | Score of Evaluation of Prelamination | Score of Bubble Occurrence Evaluation | Evaluation in High Temperature and High Humidity |
| Example 7 | 100 | 15 | 5 | 5 |
| | 70 | 15 | 5 | 3 |
| Example 8 | 100 | 15 | 5 | 5 |
| | 70 | 13 | 5 | 5 |
| Comparative Example 3 | 100 | 15 | 5 | 5 |
| | 70 | 12 | 5 | 3 |
| Comparative Example 4 | 100 | 15 | 5 | 5 |
| | 70 | 12 | 5 | 3 |

With reference to the Table 5, DSvk values of Examples 7 and 8 were measured to be less than 4, however, the DSvk values of Comparative Examples 3 and 4 were measured to be more than 6.

The DSvk/Svk values of Examples 7 and 8 were measured within the range of 0.30 to 0.60, however, the DSvk/Svk values of Comparative Examples 3 and 4 were measured to have a value of more than 1.6.

The DSvk/Sz values of Examples 7 and 8 were measured to be 0.06 or less, however, the DSvk/Sz values of Comparative Examples 3 and 4 were measured to be 0.09 or more.

The A2 values of Examples 7 and 8 were measured to be 0.18 or more, however, the A2 values of Comparative Examples 3 and 4 were measured to be 0.15 or less.

The Sz values of the Examples and Comparative Examples were measured to be a value in the range of 63 to 64.5. Through this, it can be known even though additional processing of a minute pattern is performed, the Sz value is not greatly changed.

Referring to the Table 6, in the evaluation of edge sealing, the cases of Examples obtained scores of 13 points or more under all the conditions, however, the cases of Comparative Examples 3 and 4 exhibited an evaluation score of 12 only when pre-laminated under the condition of a prelamination temperature of 70° C. Through this, it can be known the film for bonding whose DSvk value is 6 μm or less has an excellent edge sealing characteristic even though treated by a lamination process at a low temperature.

For evaluation of bubble occurrence, the evaluation scores of Examples and Comparative Examples were shown to be generally excellent, and particularly, the case of Example 8 measured to have an evaluation score of 5 points even though in the case of being exposed to an environment with long-term high temperature and high humidity as well as in an ordinary environment.

Manufacture Example 4: Processing of Roller

An additional minute pattern was formed on a concave portion of a steel roller having an embossment form, which is a matte pattern in which dots were randomly formed, and for the convex portion, grinding treatment was performed.

A roller (Rz=50 μm) having irregularities in the shape of a matte pattern as expressed in FIG. 4 was applied as ROLL 0.

ROLL 4a, ROLL 4b, and ROLL 4c were respectively manufactured by grit blast treatment for the concave portion and grinding treatment for the convex portion in the same roller as ROLL 0. Specifically, the concave portion of the matte pattern was treated with grit blast, and the convex portion of the matte pattern was treated with grinding. The grit blast treatment was operated by injecting particles filtered out by an impurity removing filter with 200 mesh having an average outer diameter of 5 μm using a direct air blast method in a distance of 40 to 45 cm and an injection pressure of 0.4 MPa. The angle between a matte pattern surface and injected particles (or a nozzle) was applied to be 85° to 105°.

ROLL 4a was processed with the above grit blast and grinding treatment one time, ROLL 4b repetitively was processed with the above grit blast and griding treatment three times, and ROLL 4c repetitively was processed with the above grit blast and grinding treatment ten times.

The rollers manufactured in this manner were applied to Examples or Comparative Examples as indicated in Table 1 below.

Manufacture Example 4: Manufacture of Film

Hereinafter, respective ingredients used in Examples and Comparative Examples are the same as below.

Polyvinyl Butyral Resin (A2): PVA having a polymerization degree of 1700 and a saponification degree of 99 and n-BAL were added to perform an ordinary synthesizing process, and thereby a polyvinyl butyral resin having a hydroxyl group of 19.6 wt %, a butyral group of 80.0 wt %, and an acetyl group of 0.4 wt % was obtained.

Polyvinyl Butyral Resin (B): PVA having a polymerization degree of 2400 and a saponification degree of 88 and n-BAL were added to perform an ordinary synthesizing process, and thereby a polyvinyl butyral resin having a hydroxyl group of 8.6 wt %, a butyral group of 79.9 wt %, and an acetyl group of 11.5 wt % was obtained.

Manufacture of Additive: Irganox1076 as an antioxidant of 0.1 parts by weight, TINUVIN-328 as a UV absorber of 0.2 parts by weight, and Mg Acetate as an adhesion control agent of 0.03 parts by weight were blended and mixed in a tumbler to be sufficiently dispersed (A total amount of 0.33 parts by weight).

Examples 9 to 11: The polyvinyl butyral resin (A2) of 72.67 wt %, 3g8 as a plasticizer of 27 wt %, and an additive of 0.33 wt % were put into one twin-screw extruder (a), and the polyvinyl butyral resin (B) and 3g8 as a plasticizer of 35 wt % were put into another twin-screw extruder (b) for co-extrusion thereof. The above compositions were shaped to be a form of (A2) composition/(B) composition/(A2) composition through a feed block and subsequently a film in the shape having a thickness of one end greater than the thickness of the other end was manufactured through a T-DIE. Before winding the film, respectively different rollers (ROLL 4a, ROLL 4b, and ROLL 4c) were applied to the upper portion and the lower portion, and through separate embossing treatment, a film to which a surface pattern was transferred was sampled to be the shape of a roll sample, to manufacture films of Examples 9 to 11 respectively. In this time, for easy transferring of the surface pattern of a film, the angle of both sides of an embossed roll was adjusted to 0.014° and the transcription was performed.

Comparative Example 5: A film of Comparative Example 1 was manufactured in the same manner as the above Examples 1 to 3 except for the embossing treatment using a roller in which additional processing of a minute pattern was not performed on the convex portion and the concave portion (ROLL 0).

Evaluation Example 4: Evaluation of Properties

Measurement of Wedge Angle

The film sample for evaluation has a thickness increasing area corresponding to the entire film, and therefore, the thicknesses of both ends were measured and applied as Ha and Hb values. Specifically, the thicknesses of both ends were measured by using Mitsutoyo 547-401 thickness gauge.

After the length of a width linking both ends of the film sample for evaluation was measured, the measured Ha value, Hb value, and w value were substituted to Equation 3 below and the measured value of wedge angle was obtained.

$$\theta = \arctan\left(\frac{Hb - Ha}{w}\right) \quad \text{[Equation 3]}$$

In the Equation 3, the Hb is the thickness of a thicker side between the both ends of the thickness increase area, the Ha is the thickness of a thinner side between the both ends of the thickness increase area, and the w is the length of a width linking the both ends of the thickness increase area.

Measurement of Surface Roughness 3D roughness was measured through a measuring device, and A1 value and A2 value were obtained respectively according to ISO_25178. The 3D roughness was measured by using a non-contact type optical microscopy available from BRUKER (model Contour GT), at VSI (Vertical scanning Interferometry) mode.

In detail, the 3D roughness values were measured by using 2× ocular lens and 5× objective lens. In this time, the area with a length of x axis from 0 to 0.887 m and a length of y axis from 0 to 0.670 mm could be scanned. The measurement was repeated five times by designing a measuring area randomly from the same pattern, and three measured values were averaged to obtain a value of the measurement.

Sz, A1 (peak area), A2 (valley area), and A2/A1 values as the result of the measurement were shown in Table 7 below.

Evaluation of Edge Sealing

Manufacture of Samples for Evaluation 1) Films of Examples and Comparative Example were cut into width*length of 1000*1000 mm, and left for two days at 20 degrees and 20 rh % (relative humidity %) to be treated with aging. A sample was picked to be 900*300 mm based on the center of the film in the width direction, and three samples were cut in the length direction as the same manner.

The samples were placed between two pieces of glass plate with a thickness of 2.1 T (T=mm) to be pre-laminated, and respective three samples for evaluation of each Example and Comparative Example were manufactured.

Each sample for evaluation had width*length of 900*300 mm, in which the one sample had a total length of four edges of 2400 mm, respective three samples for evaluation of each Examples and Comparative Example were prepared, and edge sealing thereof was evaluated in total 7.2 m.

Pre-laminating process was performed by de-airing using a vacuum ring for 5 minutes at 20° C. and maintaining at three other temperature zones of respective 70° C., 85° C., and 100° C. for 15 minutes.

Manufacture of Samples for Evaluation 2) glass plate in a thickness of 2.1 T was cut into width*length of 900*300 mm, and left for 60 days under the condition of 25° C. and 40 rh % to be aged. While a sample for evaluation was manufactured in the same manner as the Manufacture of Samples for Evaluation 1), the temperature for maintaining after deairing was applied to be 85° C.

Evaluation for Edge Sealing Degree) The samples for evaluation were evaluated by naked eyes, when a sample had perfect edge sealing and a pattern not at all shown, it was evaluated as 5 points, when a sample had good edge sealing degree and a pattern weakly identified by naked eyes, it was evaluated as 4 points, when a sample had normal edge sealing degree and a pattern identified by naked eyes, it was evaluated as 3 points, when a sample had bad edge sealing degree and a pattern identified by naked eyes, it was evaluated as 2 points, and when a sample had bad edge sealing degree and a pattern strongly identified by naked eyes, it was evaluated as 1 point. Total points of scores of respective three samples were shown in Table 8.

Evaluation of Bubble Occurrence

The samples for evaluation of Examples and Comparative Examples after being pre-laminated was pressed for 20 minutes under the condition of 140° C. and 1.2 MPa in an autoclave, and thereby a laminated glass after being mainly laminated was obtained. The time used in the main lamination comprising a heating time and a cooling time was total 90 minutes.

The bubble number occurring in the laminated glass after being mainly laminated was ascertained by naked eyes. When the sum of bubble numbers ascertained in three samples of each Example and Comparative Example was 5 or less, it was noted as 5 points, when the sum of bubble numbers was 6 to 10, it was noted as 4 points, when the sum of bubble numbers was 11 to 15, it was noted as 3 points, when the sum of bubble numbers was 16 or more, it was noted as 1 point and the result was shown in Table 8 below.

TABLE 7

| | Used Roller | Wedge Angle (°) | The Result of Surface Roughness Measurement | | | |
|---|---|---|---|---|---|---|
| | | | Sz (μm) | A1 | A2 | A2/A1 |
| Comparative Example 5 | ROLL 0 | 0.014 | 50.8 | 0.226 | 0.63 | 2.79 |
| Example 9 | ROLL 4a | 0.014 | 48.9 | 0.70 | 0.34 | 0.49 |
| Example 10 | ROLL 4b | 0.014 | 48.6 | 0.86 | 0.29 | 0.34 |
| Example 11 | ROLL 4c | 0.014 | 48.2 | 1.46 | 0.09 | 0.06 |

TABLE 8

| | Glass Type | Evaluation of Edge Sealing | | Evaluation of Bubble Occurrence Score of Bubble Occurrence Evaluation |
|---|---|---|---|---|
| | | Temperature of Prelamination | Score of Prelamination Evaluation | |
| Comparative Example 5 | Ordinary Glass | 100° C. | 14 | 5 |
| | | 85° C. | 8 | 3 |
| | | 70° C. | 4 | 1 |
| | Aged Glass | 85° C. | 4 | 1 |
| Example 9 | Ordinary Glass | 100° C. | 14 | 5 |
| | | 85° C. | 13 | 4 |
| | | 70° C. | 12 | 4 |
| | Aged Glass | 85° C. | 12 | 4 |
| Example 10 | Ordinary Glass | 100° C. | 14 | 5 |
| | | 85° C. | 12 | 4 |
| | | 70° C. | 10 | 3 |
| | Aged Glass | 85° C. | 12 | 3 |
| Example 11 | Ordinary Glass | 100° C. | 15 | 5 |
| | | 85° C. | 13 | 5 |
| | | 70° C. | 12 | 4 |
| | Aged Glass | 85° C. | 12 | 4 |

With reference to the Table 7 and Table 8, the wedge angle of each film sample for evaluation of each Example and Comparative Example was evaluated to be 0.014° in all the case as the same value.

The Sz values of Examples 9 to 11 in which additional processing of a minute pattern is performed by grit blast and grinding treatment had a difference value of 2.6 μm as the maximum when compared to the Sz value of Comparative Example 5, and thereby it could be known that even though additional processing of a minute pattern was performed on the roller surface, the value of surface roughness Sz was not greatly changed. On the other hand, in the cases of Examples 9 to 11 in which additional processing of a minute pattern was performed, the A2/A1 value was measured to be less than 1, but in the case of Comparative Example 5, A2/A1 value was measured to be 2.79 and a comparatively great difference was shown.

With reference to the Table 8, in the evaluation of edge sealing, the case of Examples 9 to 11 obtained scores of 10 or more under all the conditions, but the case of Comparative Example 5 obtained scores of 8 or less in samples pre-laminated with ordinary glasses at 85° C. and 70° C. and in a sample pre-laminated with aged glass at 85° C., and thereby it can be known that the edge sealing characteristic of a film is improved when additional processing of a minute pattern was performed on the film.

In addition, in the evaluation of bubble occurrence, the cases of Examples 9 to 11 obtained scores of 3 or more under all the conditions, but the case of Comparative Example 5 obtained 1 point only when pre-laminated with ordinary glasses at 70° C. and when pre-laminated with aged glasses at 85° C., and thereby it can be known that the deairing stability of a film is improved when additional processing of a minute pattern is performed on the film.

Manufacture Example 5: Processing or Roller

An additional minute pattern was formed on a concave portion of a steel roller having an embossment form, which is a matte pattern in which dots were randomly formed, and for a convex portion, grinding treatment was performed.

A roller (Rz=50 μm) having irregularities in the shape of a matte pattern as expressed in FIG. 4 was applied as ROLL 0.

ROLL 5a, ROLL 5b, and ROLL 5c were respectively manufactured by grit blast treatment for the concave portion and grinding treatment for the convex portion in the same roller as ROLL 0. Specifically, the concave portion of the matte pattern was treated with grit blast, and the convex portion of the matte pattern was treated with grinding. The grit blast treatment was operated by injecting particles filtered out by an impurity removing filter with 200 mesh having an average outer diameter of 5 μm using a direct air blast method in a distance of 40 to 45 cm and an injection pressure of 0.4 MPa. The angle between a matte pattern surface and injected particles (or a nozzle) was applied to be 85° to 105°.

ROLL 5a was processed with the above grit blast and grinding treatment one time, ROLL 5b was processed repetitively with the above grit blast and griding treatment two times, and ROLL 5c was processed repetitively with the above grit blast and grinding treatment four times.

The rollers manufactured in this manner were applied to Examples or Comparative Examples as indicated in Table 9 below.

Manufacture Example 5: Manufacture of Film

Hereinafter, respective ingredients used in Examples and Comparative Examples are the same as below.

Polyvinyl Butyral Resin (A1): PVA having a polymerization degree of 1700 and a saponification degree of 99 and n-BAL were added to perform an ordinary synthesizing process, and thereby a polyvinyl butyral resin having a hydroxyl group of 20.3 wt %, a butyral group of 78.9 wt %, and an acetyl group of 0.8 wt % was obtained.

Polyvinyl Butyral Resin (B): PVA having a polymerization degree of 2400 and a saponification degree of 88 and n-BAL were added to perform an ordinary synthesizing process, and thereby a polyvinyl butyral resin having a hydroxyl group of 8.6 wt %, a butyral group of 79.9 wt %, and an acetyl group of 11.5 wt % was obtained.

Manufacture of Additive: Irganox1076 as an antioxidant of 0.1 parts by weight, TINUVIN-328 as a UV absorber of 0.2 parts by weight, and Mg Acetate as an adhesion regulator of 0.03 parts by weight were blended and mixed in a tumbler to be sufficiently dispersed (A total amount of 0.33 parts by weight).

Examples 12 to 14: The polyvinyl butyral resin (A1) of 72.67 wt %, 3g8 as a plasticizer of 27 wt %, and an additive of 0.33 wt % were put into one twin-screw extruder (a), and the polyvinyl butyral resin (B) of 65 wt % and 3g8 as a plasticizer of 35 wt % were put into another twin-screw extruder (b) for co-extrusion thereof. Subsequently, the above compositions were shaped to be a form of (A1) composition/(B) composition/(A1) composition through a feed block and manufactured into a film having a thickness of one end greater than the thickness of the other end through a T-DIE. Before winding the film, respectively different rollers (ROLL 6a, ROLL 6b, and ROLL 6c with reference to Table 9) were applied to the upper portion and the lower portion, and through separate embossing treatment, a film to which a surface pattern was transferred was sampled to be the shape of a roll sample, to manufacture films of Examples 9 to 11 respectively. In this time, for easy transferring of the surface pattern of a film, the angle of both sides of an embossed roll was adjusted to 0.014° and the transferring was performed. The manufactured film had a thickness of one end of 960 μm, a thickness of the other end of 1200 μm, and a width of 1.0 M.

Comparative Example 6: A film of Comparative Example 1 was manufactured in the same manner as the above Examples 1 to 3 except for the embossing treatment using a roller in which additional processing of a minute pattern was not performed on the convex portion and the concave portion (ROLL 0).

Evaluation Example 5: Evaluation of Properties

Measurement of Wedge Angle

The film sample for evaluation has a thickness increase area corresponding to the entire film, and therefore, the thicknesses of both ends were measured and applied as Ha and Hb values. Specifically, the thicknesses of both ends were measured by using Mitsutoyo 547-401 thickness gauge.

After the length of a width linking both ends of the film sample for evaluation was measured, the measured Ha value, Hb value, and w value were substituted to Equation 3 below and the measured value of wedge angle was obtained.

$$\theta = \arctan\left(\frac{Hb - Ha}{w}\right) \quad \text{[Equation 3]}$$

In the Equation 3, the Hb is the thickness of a thicker side between the both ends of the thickness increase area, the Ha is the thickness of a thinner side between the both ends of the thickness increase area, and the w is the length of a width linking the both ends of the thickness increase area.

Measurement of Surface Roughness 3D roughness was measured through a measuring device, and Mr1 value and Mr2 value were obtained respectively according to ISO_25178. The 3D roughness was measured by using a non-contact type optical microscopy available from BRUKER (model Contour GT), at VSI (Vertical scanning Interferometry) mode.

In detail, the 3D roughness values were measured by using 2× ocular lens and 5× objective lens. In this time, the area with a length of x axis from 0 to 0.887 m and a length of y axis from 0 to 0.670 mm could be scanned. The measurement was repeated five times by designing a measuring area randomly from the same pattern, and three measured values were averaged to obtain a value of the measurement.

Sz, Mr1, Mr2, rev_Mr2, and Spv values as the result of the measurement were shown in Table 9 below.

Evaluation of Edge Sealing

Manufacture of Samples for Evaluation 1) Films of Examples and Comparative Examples were cut into width*length of 1000*1000 mm, and left for two days at 20 degrees and 20 rh % (relative humidity %) to be aged. A sample was picked to be 900*300 mm based on the center of the film in the width direction, and three samples were cut in the length direction as the same manner.

autoclave, and thereby a laminated glass after being mainly laminated was obtained. The time used in the main lamination comprising a heating time and a cooling time was total 90 minutes.

The bubble number occurring in the laminated glass after being mainly laminated was ascertained by naked eyes. When the sum of bubble numbers ascertained in three samples of each Example and Comparative Example was 5 or less, it was noted as 5 points, when the sum of bubble numbers was 6 to 10, it was noted as 4 points, when the sum of bubble numbers was 11 to 15, it was noted as 3 points, when the sum of bubble numbers was 16 or more, it was noted as 1 point and the result was shown in Table 10 below.

TABLE 9

| | Used Roller | Transferring temperature (° C.) | Wedge Angle (°) | The Result of 3D Roughness Measurement | | | | |
|---|---|---|---|---|---|---|---|---|
| | | | | Sz (μm) | Mr1 (%) | Mr2 (%) | Rev_Mr2 (%) | Spv (%) |
| Comparative Example 6 | ROLL 0 | 115 | 0.014 | 64.4 | 8.2 | 91.1 | 8.9 | −0.7 |
| Example 12 | ROLL 6a | 115 | 0.014 | 61.6 | 9.0 | 92.0 | 8.0 | 1.0 |
| Example 13 | ROLL 6b | 115 | 0.014 | 60.1 | 15.5 | 92.8 | 7.2 | 8.3 |
| Example 14 | ROLL 6c | 115 | 0.014 | 59.0 | 21.3 | 91.7 | 8.3 | 12.9 |

The samples were placed between two pieces of glass plate with a thickness of 2.1 T (T=mm) to be pre-laminated, and respective three samples for evaluation of each Examples and Comparative Example were manufactured.

Each sample for evaluation had width*length of 900*300 mm, in which the one sample had a total length of four edges of 2400 mm, respective three samples for evaluation of each Examples and Comparative Example were prepared, and edge sealing thereof was evaluated in total 7.2 m.

Pre-laminating process was performed by de-airing using a vacuum ring for 5 minutes at 20° C. and maintaining at three other temperature zones of respective 70° C., 85° C., and 100° C. for 15 minutes.

Manufacture of Samples for Evaluation 2) glass plate in a thickness of 2.1 T was cut into width*length of 900*300 mm, and left for 60 days under the condition of 30° C. and 50 rh % to be treated with aging. While a sample for evaluation was manufactured in the same manner as the Manufacture of Samples for Evaluation 1), the temperature for maintaining after deairing was applied to be 85° C.

Evaluation for Edge Sealing Degree) The samples for evaluation were evaluated by naked eyes, when a sample had perfect edge sealing and a pattern not at all shown, it was evaluated as 5 points, when a sample had good edge sealing degree and a pattern weakly identified by naked eyes, it was evaluated as 4 points, when a sample had normal edge sealing degree and a pattern identified by naked eyes, it was evaluated as 3 points, when a sample had bad edge sealing degree and a pattern identified by naked eyes, it was evaluated as 2 points, and when a sample had bad edge sealing degree and a pattern strongly identified by naked eyes, it was evaluated as 1 point. Total points of scores of respective three samples were shown in Table 10.

Evaluation of Bubble Occurrence

The samples for evaluation of Examples and Comparative Examples after being pre-laminated was pressed for 20 minutes under the condition of 140° C. and 1.2 MPa in an

TABLE 10

| | | Evaluation of Edge Sealing | | Evaluation of Bubble |
|---|---|---|---|---|
| | Glass Type | Temperature of Prelamination | Score of Prelamination Evaluation | Occurrence Score of Bubble Occurrence Evaluation |
| Comparative Example 6 | Ordinary Glass | 100° C. | 14 | 5 |
| | | 85° C. | 8 | 3 |
| | | 70° C. | 5 | 1 |
| | Aged Glass | 85° C. | 5 | 1 |
| Example 12 | Ordinary Glass | 100° C. | 14 | 5 |
| | | 85° C. | 12 | 5 |
| | | 70° C. | 11 | 4 |
| | Aged Glass | 85° C. | 11 | 4 |
| Example 13 | Ordinary Glass | 100° C. | 15 | 5 |
| | | 85° C. | 14 | 5 |
| | | 70° C. | 12 | 4 |
| | Aged Glass | 85° C. | 12 | 5 |
| Example 14 | Ordinary Glass | 100° C. | 15 | 5 |
| | | 85° C. | 15 | 5 |
| | | 70° C. | 13 | 5 |
| | Aged Glass | 85° C. | 13 | 5 |

With reference to the Table 9, the wedge angle of each film sample of each Example and Comparative Example was evaluated to be 0.014°.

The Sz values of Examples 1 to 3 in which additional processing of a minute pattern is performed by grit blast and grinding treatment had a difference value of 5.4 μm as the maximum when compared to the Sz value of Comparative Example 5, and thereby it could be known that even though additional processing of a minute pattern was performed on the roller surface, the value of surface roughness Sz was not greatly changed.

In addition, in the cases of Examples 12 to 14 in which additional processing of a minute pattern was performed, Spv values were distributed in the range of 1.0 or more, and the Spv values increased in order of Examples 12, 13 and 14, however, in the case of Comparative Example 6 in which additional processing of a minute pattern, Spv value was measured to be less than 0. Through the above, it can be known when additional processing of a minute pattern was performed on the roller surface, the density distribution of protruding valley in the valley portion of the surface of the manufactured film could be relatively decreased and the Spv value could be increased, and as the number of additional processing of a minute pattern was increased, the Spv values were also increased.

With reference to the Table 10, in the edge sealing evaluation, the cases of Examples 12 to 14 obtained a score of 11 or more under all the conditions, however, the case of Comparative Example 6 obtained a score of less than 10 under all the conditions except for the case of being pre-laminated with ordinary glasses at 100° C., and particularly when being pre-laminated with ordinary glasses under the condition of a pre-lamination temperature of 70° C., the score of evaluation was 5 points only. Through the above, it can be known that a film for bonding having an Spv value of 0% or more has a stable edge sealing characteristic, and particularly, has an excellent edge sealing characteristic when pre-laminated at a low temperature.

Additionally, the cases of Examples obtained 4 points or more under all the conditions, however, the case of Comparative Example 6 obtained a score of 3 or less except for a sample pre-laminated with ordinary glasses at 100° C., and particularly, when pre-laminated with ordinary glasses at 70° C., the score of evaluation was 1 point only. Through the above, it can be known that when additional processing of a minute pattern is performed on the film for bonding, the de-airing stability of the film is improved, and particularly when pre-laminated at a low temperature, the film can have an excellent de-airing characteristic.

In the cases of Examples 12 to 14 applying aged glasses, the score of pre-lamination evaluation was measured to be 11 points or more, the score of evaluation of bubble occurrence was measured to be 4 points or more, however, the case of Comparative Example 6 obtained a score of pre-lamination evaluation of 5 points only, and a score of evaluation of bubble occurrence of 1 point only. Through this, is can be known that when laminated by applying aged glass whose surface is not even, laminating using a film for bonding in which additional processing of a minute pattern is performed enables stable edge sealing and de-airing performance.

Although the exemplary embodiments have been described in detail, the scope of the present invention is not limited thereto, and modifications and alterations made by those skilled in the art using the basic concept of the present invention defined in the following claims fall within the scope of the present invention.

DESCRIPTION OF FIGURE NUMBERS

100: Film for Bonding
500, 500': Embossed Roller
10, 11: Bonding Layer
20: Sound Insulating Layer
A: Thickness Increase Area

What is claimed is:

1. A film for bonding comprising:
an embossed surface,
wherein the embossed surface has an A2/A1 value of 1 or less,
wherein the film comprises a thickness increasing area,
wherein the thickness increasing area has both ends which are one end and the other end wherein a thickness of the one end is different from a thickness of the other end,
wherein a wedge angle ($\theta$) is calculated by below Equation 1, and
wherein the wedge angle of the thickness increasing area is 0.01 to 0.04°;

$$\theta = \arctan\left(\frac{Hb - Ha}{w}\right) \qquad \text{[Equation 1]}$$

where, in Equation 1, Hb is a thickness of thicker one between the one end and the other end of the thickness increasing area, Ha is a thickness of thinner one between the one end and the other end of the thickness increasing area, and w is a width from the one end to the other end of the thickness increasing area.

2. The film for bonding of claim 1,
wherein the embossed surface has a Sz value of 30 to 90 um.

3. The film for bonding of claim 1,
wherein the A1 value is 0.5 or more.

4. The film for bonding of claim 1,
wherein the A2 value is 0.6 or less.

5. The film for bonding of claim 1,
wherein a ratio of the Ha to the w is 0.0002 to 0.0015.

6. The film for bonding of claim 1,
which is a single layer film or a laminated film with two or more layers, and comprises a polyvinyl acetal resin.

7. A film for bonding comprising:
an embossed surface having a regular pattern or an irregular pattern,
wherein the embossed surface has a Mr1 value and a Mr2 value,
wherein a rev_Mr2 value is a value of subtracting the Mr2 value from 100%, and
wherein the embossed surface has a Mr1 value which is equal to or greater than the rev_Mr2 value.

8. The film for bonding of claim 7,
a peak valley distribution value is calculated by below Equation 1, and
wherein the embossed surface has the peak valley distribution value of 0% to 25%;

$$Spv = Mr1 - rev\_Mr2 \qquad \text{[Equation 1]}$$

wherein in the Equation 1,
the Spy is peak valley distribution value, and
the rev_Mr2 value is a value of subtracting the Mr2 value from 100%.

9. The film for bonding of claim 7,
wherein the Mr1 value is 10% or more.

10. A film for bonding comprising:
an embossed surface having a regular pattern or an irregular pattern,
wherein the embossed surface has a DSvk value of 6 um or less which is calculated by below Equation 2, and
which comprises a plasticizer of 24 to 40 wt % based on the whole weight of the film for bonding;

$$DSvk = S*vk - Svk \qquad \text{[Equation 2]}$$

wherein in the Equation 2,
the Svk value is a value calculated by ISO_25178, and
the S*vk value is a height value of a point where an areal material ratio is a Mr2 in an areal material ratio curve according to ISO_25178.

11. The film for bonding of claim 10, wherein a ratio of the Svk value to the DSvk value is 0.1 to 1.5.

12. The film for bonding of claim 10, wherein the S*vk is 12 um or less.

13. The film for bonding of claim 10, wherein an A2 value is 0.16 to 0.5.

* * * * *